US010423928B2

(12) United States Patent
Spradling et al.

(10) Patent No.: US 10,423,928 B2
(45) Date of Patent: Sep. 24, 2019

(54) METHOD AND SYSTEM OF GENERATING AUDIT PROCEDURES AND FORMS

(75) Inventors: Lee Scott Spradling, Fort Worth, TX (US); Stephen Wilson Lindsey, Fort Worth, TX (US); Marriette Louise Kershner, Arlington, TX (US); Jason Robert Penneman, Fort Worth, TX (US); Shane Eugene Jimmerson, Arlington, TX (US)

(73) Assignee: THOMSON REUTERS GLOBAL RESOURCES UNLIMITED COMPANY (CH)

( * ) Notice: Subject to any disclaimer, the term of this patent is extended or adjusted under 35 U.S.C. 154(b) by 799 days.

(21) Appl. No.: 12/977,631

(22) Filed: Dec. 23, 2010

(65) Prior Publication Data
US 2011/0184776 A1   Jul. 28, 2011

Related U.S. Application Data

(63) Continuation-in-part of application No. 11/977,288, filed on Oct. 24, 2007, now Pat. No. 8,036,980.

(51) Int. Cl.
*G06Q 10/10* (2012.01)
*G06Q 40/02* (2012.01)
*G06Q 10/06* (2012.01)

(52) U.S. Cl.
CPC ......... *G06Q 10/10* (2013.01); *G06Q 10/0635* (2013.01); *G06Q 40/02* (2013.01)

(58) Field of Classification Search
USPC ............... 705/8, 35, 38, 7.23, 7.38; 706/47; 714/25
See application file for complete search history.

(56) References Cited

U.S. PATENT DOCUMENTS

| 6,314,415 B1* | 11/2001 | Mukherjee | G06F 9/451 706/47 |
| 2004/0044617 A1* | 3/2004 | Lu | G06Q 40/02 705/38 |
| 2004/0103102 A1* | 5/2004 | Nelson | G06F 16/94 |
| 2006/0212373 A1* | 9/2006 | Maxwell | G06Q 40/00 705/35 |
| 2007/0136622 A1* | 6/2007 | Price | G06Q 10/06 714/25 |

(Continued)

*Primary Examiner* — Fahd A Obeid
*Assistant Examiner* — Reva R Danzig
(74) *Attorney, Agent, or Firm* — Thomson Reuters

(57) ABSTRACT

A professional services audit tool is disclosed that includes an application that performs a variety of functions such as completing certain audit planning processes/forms, offering a tailored set audit programs based on the assessed risks, allowing users to further tailor the suggested audit programs, and rendering these audit programs in a helpful format. The application also provides functionality to perform and document audit work, guide the auditor though the engagement process, isolate audit program steps by related assertions and identified risks to ensure that audit plans are tailored to specific risks, provide an engagement dashboard to view at a glance both the overall audit and for each audit area, the steps which are not yet started, in progress, or completed, and allow for the integration of generated documents to be automatically stored to, accessed from, and synchronized with various external engagement management systems.

50 Claims, 44 Drawing Sheets

(56) References Cited

U.S. PATENT DOCUMENTS

2007/0156495 A1\* 7/2007 King ................ G06Q 10/06
705/7.28
2008/0077530 A1\* 3/2008 Banas ............... G06Q 10/06
705/50

\* cited by examiner

| Audit Area | Include? |
|---|---|
| Cash | ☑ |
| Accounts Receivable and Sales | ☑ |
| Inventory and Cost of Sales | ☑ |
| Inventory Observation | ☑ |
| Property | ☑ |
| Investments and Derivatives | ☑ |
| Other Assets | ☑ |
| Accounts Payable and Other Liabilities | ☑ |
| Notes Payable and Long-term Debt | ☑ |
| Income Taxes | ☑ |
| Equity | ☑ |
| Income and Expenses | ☑ |

Engagement Setup - 3 of 3

Select the audit areas you wish to include in the engagement

Add Audit Area

< Previous | Finish | Cancel

Diagnostics Report

1. The following Planning Forms contain questions that have not been answered:

CX-1.1 - Engagement Acceptance Form
   Questions 1.b, 1.c, 1.d, 1.e, 2, 3, 4.a, 4.b, 4.c, 4.d, 4.e, 4.f, 4.g, 4.h, 4.i, 4.j, 5.a, 5.b, 5.c, 5.d, 6, 7.a, 7.b.(1), 7.b.(2), 7.b.(3), 7.c.(1), 7.c.(2), 7.c.(3), 7.c.(4), 7.c.(5), 7.c.(6), 7.d, 7.d.(1), 7.d.(2), 7.e, 7.f, 7.g, 8 and 9

CX-3.1 - Understanding the Entity and Its Environment
   Questions 1, 2, 3, 4, 6, 8, 9, 10, 11, 12, 13, 14, 15, 16, 17, 18, 19, 20, 21, 22, 23, 25, 26, 27, 28, 29, 31, 32 and 1

CX-3.3 - Fraud Risk Inquiries Form
   Questions 1.h, 2, 3.d and 4.c

CX-4.1 - Understanding the Design and Implementation of Internal Control
   Questions 1, 2, 3, 4, 5, 12, 13.a, 13.b, 14, 15, 16, 17, 19 and 20

CX-6.1 - Risk Identification Form
   Questions 1, 2, 3, 4, 5, 6, 7, 8, 9, 10, 11, 12, 13, 14, 15, 16 and 17

2. An Audit Approach has not been selected for:

Cash
   Accounts Receivable and Sales
   Inventory and Cost of Sales
   Property
   Investments and Derivatives
   Other Assets
   Accounts Payable and Other Liabilities
   Notes Payable and Long-term Debt

CX-3.3: Fraud Risk Inquiries Form

Entity: ☐
Completed by: ☐

Balance Sheet Date: ☐
Date: ☐

Instructions: The purpose of this form is to document the auditor's inquiries of management and others about fraud risks. Inquiries should be made of management, other employees, and (if applicable) internal auditors and the audit committee. Use professional judgment to determine which members of management and employees to interview, the extent of inquiries, and whether it is necessary to obtain corroborating information. A list of required inquiries is provided for each step on the form to ensure that all professional requirements are met. It is not necessary to repeat this list when documenting the inquiries; rather, document the primary areas of focus during the interview, the responses to the inquiries, and the related risks. Fraud inquiries may occur prior to, or in conjunction with, other risk assessment procedures, but should take place each year. Information gathered about potential risks or any identified risk should be considered at or carried forward to the "Risk Identification Form" () or the "Risk Assessment Summary Form" ().

1. Inquire of management personnel or the owner/manager about the risks of fraud and how the entity addresses them. Specifically ask about the following:
   a. Their knowledge of any actual fraud or suspicions of fraud affecting the entity.
   b. Their awareness of any allegations of fraud or suspected fraud affecting the entity.
   c. Their understanding of the risks of fraud within the entity, including any specific fraud risks the entity has identified or account balances or transaction classes that may be susceptible to fraud.
   d. How they communicate to employees the importance of ethical behavior and appropriate business practices.
   e. Programs and controls the entity has implemented to address identified fraud risks or otherwise help prevent

FIGURE 19

General Planning Procedures

| | Objectives | | Steps |
|---|---|---|---|
| 1. Plan Audit and Identify Risks | A, D | B | Perform client acceptance or continuance procedures, including consideration of independence and other ethical requirements, by completing or updating the "Engagement Acceptance Form" at ASB-CX-1.1 or "Engagement Continuance Form" at ASB-CX-1.2. Consider any risks identified in the acceptance or continuance procedures when completing "Understanding the Entity and Identifying Risks" at ASB-CX-3.1 and the "Risk Assessment Summary Form" at ASB-CX-7.1. |
| General Planning Procedures | | | |
| CX-1.1: Engagement Acceptance Form | A | B | Review correspondence files, prior-year audit workpapers, permanent files, financial statements, and auditor's reports. Also, read any current-year interim financial statements. |
| CX-3.1: Understanding the Entity and Identifying Risks | A | B | Determine the extent of involvement, if any, of other audit firms, consultants, specialists, or internal auditors. |
| CX-3.2: Engagement Team Discussion | A | B | Establish a preliminary audit strategy. |
| | A, D | B | Establish and document an understanding with the client about the services to be performed. |
| CX-3.3: Fraud Risk Inquiries Form | A | B | Perform risk assessment procedures to obtain an understanding of the entity and its environment, including its internal control, and to identify the risks of material misstatement. |
| Internal Control | A | B | Complete the "Financial Statement Materiality Worksheet for Planning Purposes" at ASB-CX-2 to determine and document one or more levels of materiality and tolerable misstatement. |
| 2. Assess Effects of Risks | A | B | Assess the risk of material misstatement of the financial statements and develop your responses by completing ASB-CX-7.1 "Risk Assessment Summary Form." |
| 3. Review and Modify Audit Programs | A | B | Discuss the type, expected scope, and timing of the audit with the client. Also, discuss adequacy of working space for the audit team, access to client records, and assistance, if any, to be provided by the client. |
| | A, D | B | Finalize a time budget by audit area. |

FIGURE 22

Audit Program for General Planning Procedures

Index GP-Program-1

| | Objectives | Steps | N/A Performed by and Date | Workpaper Index |
|---|---|---|---|---|
| | A, C | Perform client acceptance or continuance procedures, including consideration of independence and other ethical requirements, by completing or updating the "Engagement Acceptance Form" at ASB-CX-1.1 or "Engagement Continuance Form" at ASB-CX-1.2. Consider any risks identified in the acceptance or continuance procedures when completing "Understanding the Entity and Identifying Risks" at ASB-CX-3.1 and the "Risk Assessment Summary Form" at ASB-CX-7.1.<br>Practical Considerations | | CX-1.2<br>CX-1.1<br>CX-7.1 |
| | A | Review correspondence files, prior-year audit workpapers, permanent files, financial statements, and auditor's reports. Also, read any current-year interim financial statements. | | |
| | A | Determine the extent of involvement, if any, of other audit firms, consultants, specialists, or internal auditors. | | |
| | A | Establish a preliminary audit strategy. | | |
| | A, C | Establish and document an understanding with the client about the services to be performed. | | |
| | A | Perform risk assessment procedures to obtain an understanding of the entity and its environment, including its internal control, and to identify the risks of material misstatement. | | |
| | A | Complete the "Financial Statement Materiality Worksheet for Planning Purposes" at ASB-CX-2 to determine and document one or more levels of materiality and tolerable misstatement. | | |
| | A | Assess the risk of material misstatement of the financial statements and develop your responses by completing ASB-CX-7.1 "Risk Assessment Summary Form." | | CX-7.1 |
| | A, C | Develop an audit plan by preparing audit work programs for each significant area covered by the audit, giving effect to the risk assessment, audit approach, and other responses summarized at ASB-CX-7.1 | | |

Navigation panel:
- Planning
  - Planning
  - Cash
  - Accounts Receivable
  - Inventory
  - Property
  - Investments
  - Other Assets
  - Accounts Payable
  - Notes Payable
  - Income Taxes
  - Equity
  - Income and Expenses
  - General Auditing
    - CX-3.2 Engagement Team Discussion
    - CX-3.3 Fraud Risk Inquiries Form
    - Internal Control
    - 2. Assess Effects of Risks
    - 3. Review and Modify Audit Programs

Audit Program for General Planning Procedures    Index GP-Program-1

| Objectives | Steps | N/A Performed by and Date | Workpaper Index |
|---|---|---|---|
| A, D | ⊞ Perform client acceptance or continuance procedures, including consideration of independence and other ethical requirements, by completing or updating the "Engagement Acceptance Form" at ASB-CX-1.1 or "Engagement Continuance Form" at ASB-CX-1.2. Consider any risks identified in the acceptance or continuance procedures when completing "Understanding the Entity and Identifying Risks" at ASB-CX-3.1 and the "Risk Assessment Summary Form" at ASB-CX-7.1.<br>⊞ Practical Considerations | JKS 2/19/09 | CX-1.1<br>CX-3.1<br>CX-7.1 |
| A | Review correspondence files, prior-year audit workpapers, permanent files, financial statements, and auditor's reports. Also, read any current-year interim financial statements. | | |
| A | ⊞ Determine the extent of involvement, if any, of other audit firms, consultants, specialists, or internal auditors. | | |
| A | ⊞ Establish a preliminary audit strategy. | | |
| A, D | ⊞ Establish and document an understanding with the client about the services to be performed. | | |
| A | ⊞ Perform risk assessment procedures to obtain an understanding of the entity and its environment, including its internal control, and to identify the risks of material misstatement. | | |
| A | Complete the "Financial Statement Materiality Worksheet for Planning Purposes" at ASB-CX-2 to determine and document one or more levels of materiality and tolerable misstatement. | | |
| A | ⊞ Assess the risk of material misstatement of the financial statements and develop your responses by completing ASB-CX-7.1 "Risk Assessment Summary Form." | | CX-7.1 |
| A, D | ⊞ Develop an audit plan by preparing audit work programs for each significant area covered by the audit, giving effect to the risk assessment, audit approach, and other responses summarized at ASB-CX-7.1. | | |

[< Previous]  [Next >]

| Assertions | Audit Program for Accounts Receivable and Sales | | Index B-AP |
|---|---|---|---|
| | Steps | N/A Performed by and Date | Workpaper Index |
| | ⊟ Accounts Receivable (Basic) | | |
| EO, C, A(1)... Ⓑ | ⊟ 1. Perform the following analytical procedures: | | |
| EO, C, A(1)... Ⓑ | a. Compare the balance in trade accounts receivable with the balance for prior years or other expectation. | | 🗋 |
| EO, C, A(1)... Ⓑ | b. Compute the ratio of accounts receivable balance to net credit sales for the current year and compare with the ratio for prior years or other expectation. | | 🗋 |
| EO, C, A(1)... Ⓑ | c. Investigate any unexpected results (that is, ratios or variations different from what would be expected), considering known changes in client or industry operations or business conditions, such as price changes, etc. | | 🗋 |
| | ⊟ Practical Considerations | | |
| | When investigating unexpected results, consider whether tests of details of transactions (such as vouching) or other extended procedures are necessary to obtain sufficient audit evidence. | | |
| | ASB-CX-9.2 presents a worksheet for calculating common ratios. | | |
| | PPC's *e-Workpapers for Nonpublic Companies* provides an electronic "Accounts Receivable Analysis" worksheet that provides for the calculation of certain ratios relating to accounts receivable and the allowance for doubtful accounts. | | |
| | Data extraction software (DES) can be used to efficiently perform tasks such as comparing balances to prior-year balances in total or by customer, calculating days outstanding by major customer category, and computing ratios such as those listed above. Chapter 2 provides guidance on using DES. | | |
| EO, C, A(1)... Ⓑ | ⊟ 2. Obtain and review a reconciliation of the aged accounts receivable trial balance to the general ledger account balance. | | 🗋 |
| EO, C, A(1)... Ⓑ | a. Obtain and document an explanation for any unusual reconciling items. Review documentation supporting reconciling items and | | 🗋 |

Audit Program for Accounts Receivable and Sales

Index B-AP

| Assertions | Steps | N/A Performed by and Date | Workpaper Index |
|---|---|---|---|
| | Accounts Receivable (Basic) | | |
| | 1. Perform the following analytical procedures: | | |
| EO, C, ACL... B | a. Compare the balance in trade accounts receivable with the balance for prior years or other expectation. | | |
| EO, C, ACL... B | b. Compute the ratio of accounts receivable balance to net credit sales for the current year and compare with the ratio for prior years or other expectation. | | |
| EO, C, ACL... B | c. Investigate any unexpected results (that is, ratios or variations different from what would be expected), considering known changes in client or industry operations or business conditions, such as price changes, etc. | | |
| | Practical Considerations | | |
| | When investigating unexpected results, consider whether tests of details of transactions (such as vouching) or other extended procedures are necessary to obtain sufficient audit evidence. | | |
| | ASB-CX-9.2 presents a worksheet for calculating common ratios. | | |
| | PPC's e-Workpapers for Nonpublic Companies provides an electronic "Accounts Receivable Analysis" worksheet that provides for the calculation of certain ratios relating to accounts receivable and the allowance for doubtful accounts. | | |
| | Data extraction software (DES) can be used to efficiently perform tasks such as comparing balances to prior-year balances in total or by customer, calculating days outstanding by major customer category, and computing ratios such as those listed above. Chapter 9 provides guidance on using DES. | | |
| EO, C, ACL | 2. Obtain and review a reconciliation of the aged accounts receivable trial balance to the general ledger account balance. | | |
| EO, C, ACL | a. Obtain and document an explanation for any unusual reconciling items. Review documentation supporting reconciling items and | | |

METHOD AND SYSTEM OF GENERATING AUDIT PROCEDURES AND FORMS

CROSS-REFERENCE TO RELATED APPLICATIONS

This application is a continuation-in-part of U.S. application Ser. No. 11/977,288 filed Oct. 24, 2007 now U.S. Pat. No. 8,036,980, for a Method and System of Generating Audit Procedures and Forms, the content of which is incorporated herein in its entirety.

COPYRIGHT NOTIFICATION

Portions of this patent application include materials that are subject to copyright protection. The copyright owner has no objection to the facsimile reproduction by anyone of the patent document itself, or of the patent application as it appears in the fifes of the United States Patent and Trademark Office, but otherwise reserves all copyright rights whatsoever in such included copyrighted materials.

FIELD OF THE INVENTION

The present invention relates to the provision of and tools to assist in the provision of professional services, specifically including auditing services. More particularly, the present invention relates to computer-implemented tools, resources, and processes for conducting audits.

BACKGROUND OF THE INVENTION

As companies continue to strive for efficiency, consistency and flexibility, computers and software executed on computers are increasingly relied upon to automate, semi-automate, enhance, quicken and make reliable and uniform business processes. This is true even in fields of professional service providers, such as financial auditors, and fields in which standardized procedures and documents govern acceptable and "best" practices. For instance, organizations, such as FASAB (Federal Accounting Standards Advisory Board), FASB (Financial Accounting Standards Board), AICPA (American Institute of Certified Public Accountants), IASB (International Accounting Standards Board), the SEC, and PCAOB (Public Company Accounting Oversight Board) promulgate rules and regulations, e.g., GAAS (generally accepted auditing standards), GAAP (generally accepted accounting principles), and IFRS (International Financial Reporting Standards), that govern the way companies are reviewed for integrity of financial accounting and operation. GAAS is principally comprised of ten auditing standards developed by AICPA that establish general standards (3) and standards related to field work (3) and reporting (4), including whether the report is in accordance with GAAP, and related interpretations.

In the field of auditing, although GAAP and GAAS provide guidelines by which auditors should conduct audits, there is a significant amount of discretion and judgment that must be exercised by the professional in order to determine the set of procedures required under the particular set of circumstances. This may also depend on the purpose and the intended audience to receive and interpret/rely on the report, and whether the entity being audited is public or non-public or governmental. Public or non-public, investors, banks, and other persons of interest rely on financial accounting information when determining whether to invest in a company, grant a loan to a company, merge with a company, etc. Standards are intended to promote best practices and uniformity, and therefore reliability, in the auditing process so that the resulting report may be viewed as unbiased, accurate and trustworthy.

Companies, such as Thomson Corporation, provide tools, resources and services to assist accountants and auditors. For instance, Thomson PPC's e-Practice Aids is a series of titles or guides that give guidance and provide materials and procedures consistent with standards. See e.g., *PPG's Guide To Audit Of Nonpublic Companies,* $25^{th}$ Edition, January 2007. Auditors may rely on the guides or titles in conducting audits. Electronic tools, for instance Thomson's e-Tools, and electronic versions of guides, Thomson e-Practice Aids, help auditors take their tools and resources with them when conducting field work or may make them accessible from remote locations or at least electronically. Computers are also helpful in collecting client data and capturing assessment data. What is needed is an integrated system for planning and conducting audits, and for processing collected and risk related assessment data to determine and generate and present a suggested audit approach and set of procedures consistent with relevant standards and guides.

SUMMARY OF THE INVENTION

The present invention addresses the shortcomings of the prior art and provides, among other things, a powerful computer-implemented tool to assist in making risk assessments and for generating procedures, conducting audits, and coordinating documents and other work product in assessing risks associated with business processes and operations. More particularly, the present invention relates to systems and techniques for planning and conducting audits in response to identified risks and risk assessments.

The present invention comprises a logic scheme wherein an auditor is prompted with a series of questions or prompts for information and the answers or responses given by the auditor are used as input to the logic sequence in determining the procedures the auditor will use when performing the audit. The present invention may be used by auditors in performing audits of non-public as well as public companies, governmental organizations, and other entities and typically involves the generation of work product capturing or summarizing the effort and underlying basis for opinions associated with the effort.

In one respect, the invention provides a professional services audit tool that includes an application that performs a variety of functions such as completing certain audit planning processes/forms (including assessing risks related to the financial statements being audited), offering a tailored set audit programs based on the assessed risks, allowing users to further tailor the suggested audit programs, and rendering theses audit programs in a helpful format, e.g., Thomson Corporation's PPC SMART e-Practice Aids format. The application also provides functionality to guide the auditor though the engagement process, isolate audit program steps by related assertion and identified risk to ensure that audit plans are tailored to specific risks, provide an engagement dashboard to view at a glance both the overall audit and for each audit area steps not yet started, in progress, or completed, and allow for the integration of generated documents to be stored to and accessed from various external engagement management systems. In one manner, to use the application, each user also must own and have a valid license installed of an associated practice aid product or suite, e.g., Thomson's e-Practice Aid product. In this example, the e-Practice Aid corresponds to one of a set of audit types or titles.

The present invention includes one or more of the following advantages whereby users may: complete audit documentation; identify and capture audit risks affecting your engagement; select an audit strategy in response to the user's risk assessment; automatically generate suggested audit programs and procedures; efficiently customize using GUI drag and drop functionality; produce tailored practice aids for the particular engagement such as in performing an audit; automate the audit planning and risk assessment process; optimize the user's professional audit judgment; improve linkage between audit risk and procedures performed; increase audit effectiveness and reduce risk; and increase consistency across audit engagements.

One further benefit of the present invention is that an auditor can be sure to include all relevant information in the audit procedures without sacrificing detail. The prompt-response method of the present invention directs the auditor to consider piecemeal whether each individual component of the possible audit procedures should be included. By doing this, the audit procedures will be far clearer and less confusing to both the auditor and the audited parties.

Another benefit of the present invention relates to the field work portion of an audit. As used herein the phrase 'field work' refers to the process of gathering audit information and analyzing and evaluating that information. For example, using the present invention, data and information gathered are automatically shared between practice aids. Planning materiality, tolerable misstatement, and risk assessments are carried throughout the audit engagement, and staff can be alerted to any errors or inconsistencies thus improving quality of the audit.

The auditor as described in the present invention is intended to include every person who may use the program to assess risk facing an enterprise. The applications in the context of auditing cover, for example, the following categories: accounting, audit & attest; compilation and review; non-profit organizations; governments; specialized industries; and bookkeeping services.

Once the auditor has responded to certain prompts, a series of tailored audit procedures will be created corresponding to each audit area the auditor has selected. Audit areas are intended to include cash, accounts receivables and sales, inventory and costs of sales, inventory observation, property, investments and derivatives, other assets, accounts payable and other liabilities, notes payable and long-term debt, income taxes, equity, and incomes and expenses.

The above-mentioned audit procedures are created using a logic system based primarily on the input of assertions associated with Risk of Material Misstatement (RMM), but include such other facts as fraud risks. In one manner, when one or more or a particular combination of assertions are evaluated to be "high," one or more extended procedures will be suggested when creating or generating the audit procedures. The extended procedures suggested will relate particularly to that area or assertion that is deemed to be a high risk. If no high risks are involved with the particular audit, then the "Basic" approach will be suggested. An exception exists where the risk is moderate and there is a risk of fraud or other significant risk. In such instances, an Extended approach will be suggested for that assertion.

The term "assertion" as used herein means representations that are embodied in components being audited.

Areas of the generated audit procedures will be filled in by information inputted during the engagement process and planning forms of FIGS. 2-13(j). Content is placed in particular places within the generated document using the bookmarks and cross-reference feature of Microsoft Word from the Microsoft Office. Forms tailored by variable data input are known as "smart" forms. Exemplary technology that may be used to accomplish the "on the fly" creation of documents includes one or more of XML, Microsoft WORD object model and WORD templates.

The present invention is intended to be medium-neutral, being equally capable as a desktop program, a web-enabled program, a web-based program, and any variation thereof, being broad enough to include all future media.

In one embodiment the present invention provides a system for assessing risks associated with an audit. The system comprises: a computer having an associated memory, display, and input device and adapted to execute code; a graphical user interface adapted to operate on the computer and adapted to present a plurality of audit items and a set of risk levels associated with the plurality of audit items and adapted to receive a set of responses by the input device; a response code set adapted to be executed on the computer and adapted to process the set of responses; and an audit code set adapted to be executed by the computer and adapted to automatically generate a suggested audit approach based at least in part on the set of responses. In addition, the graphical user interface may be adapted to present a set of prompts designed to elicit the set of responses, the set of responses being associated with a set of risks associated with the audit. Further, the audit code set may be further adapted to present by the graphical user interlace a set of procedures based at least in part on the suggested audit approach. Also, the responses may represent a set of assertions of risk level associated with the plurality of audit items.

The system may further comprise a selection code set adapted to provide selection of a set of at least two audit approaches comprising the suggested audit approach and an alternative audit approach. The suggested audit approach may be either basic or extended, for example. The set of risk levels may comprise a first risk level, a second risk level, and a third risk level. Also, in the system each response in the set of responses may be a selected risk level from the set of risk levels and wherein the first risk level is low, the second risk level is moderate, and the third risk level is high. The graphical user interface may be further adapted to present an electronic audit form associated with an audit and the electronic form may comprise the plurality of audit items and possible risk levels. The audit code set may be further adapted to determine a set of procedures based at least in part on the set of responses. The audit code set may be further adapted to present a set of electronic documents associated with the suggested audit approach.

In another embodiment the invention provides a computer-implemented method or process for assessing risks associated with an audit. The process includes the step of presenting to a user a plurality of audit items and a set of risk levels associated with the plurality of audit items. The presenting step may further comprise presenting a plurality of prompts designed to elicit a set of responses from a user/auditor wherein the set of user responses are associated with a set of risks associated with the audit. Further, the set of risk levels may be associated with a set of assertions associated with the plurality of audit items. Also, the set of risk levels may include at least a first risk level and a second risk level of different degrees of risk. The method further includes the step of processing a set of responses received from the user in response to the items presented. The method includes the step of automatically generating a suggested audit approach that is based at least in part on the processing step.

In addition, the exemplary method may include the following steps. The step of determining a set of procedures that are based at least in part on the responses from the response processing step. An additional step involves presenting the set of procedures to the user based at least in part on the suggested audit approach. The method may also include the step of presenting the user with a set of at least two audit approaches comprising the suggested audit approach and an alternative audit approach from which the user may select. The suggested audit approach may be one of basic, limited or extended. In the method, each response in the set of responses may be a selected risk level from the set of risk levels representing different levels of risk. The presenting step may include presenting an electronic audit form associated with the audit being performed by the user. The electronic form may comprise the plurality of audit items and the set of risk levels. The automatically generating step may further include determining a set of procedures based at least in part on the set of user responses and the suggested audit approach may include presenting the set of procedures.

The method may also include the step of editing the determined set of procedures from the generating step to result in a customized set of procedures. The method may also include the step of presenting a set of electronic documents associated with the suggested audit approach.

The system may be configured and the method may be performed in a variety and combination of environments and architectures, including Internet/WWW-based applications, desktop applications, and WWW-enabled applications. In one exemplary architecture, a user at a remote workstation may have executing thereon software so that the user is not writing back to the central server database until the user chooses to save changes made. Until the changes are saved, the user is working in short-term memory and the user has the ability to perform "what if" scenarios.

The present invention builds on existing practice aids to provide an integrated audit planning and risk assessment approach to engagements. The invention provides an audit tool that allows auditors to complete audit planning documentation, identify and capture audit risks affecting the engagement, automatically generate suggested audit programs, select from suggested and alternative audit strategies responsive to auditor risk assessment, customize audit program aspects with user-friendly GUI and drag and drop functionality, and produce tailored practice aids for the engagement. To a large extent the present invention may be used to automate the audit planning and risk assessment process, optimize judgments, improve linkage between audit risk and procedures performed, increase audit effectiveness and reduce risk, and increase consistency across audit engagements. These and other objects and benefits of the present invention are made more apparent with the aid of the following description and figures.

Various systems, as well as articles that include a machine-readable medium storing machine-readable instructions for implementing the various techniques, are disclosed. Details of various implementations are discussed in greater detail below.

Additional features and advantages will be readily apparent from the following detailed description, the accompanying drawings and the claims.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

FIG. 5 depicts an exemplary screen for selecting audit areas related to a particular engagement;

FIG. 6 depicts an Engagement Acceptance Form and related screen for use in a client assessment aspect of the present invention;

FIG. 8 depicts an Understanding the Entity and its Environment screen used in gathering audit related data;

FIG. 9 depicts an Engagement Team Discussion form and related screen in keeping with the present invention;

FIG. 10 depicts the Fraud Risk Inquiries Form and related screen in keeping with the present invention;

FIG. 11 depicts the Understanding the Design and implementation of Internal Control form and related screen in keeping with the present invention;

FIG. 12 depicts the Risk Identification Form and related screen in keeping with the present invention;

FIG. 13 depicts an exemplary audit area Risk Assessment Summary Form and related screen in keeping with the present invention;

FIG. 14 depicts the risks entered in FIG. 7 that are identified as a risk to the overall finance statements;

FIG. 15 depicts a screen shot illustrating the procedures generated by inputted data related to one of the audit area audit programs;

FIG. 16 depicts a screen illustrating procedures for performing an audit report;

FIG. 17 depicts a diagnostic report and related screen in keeping with the present invention;

FIG. 18 depicts the generated audit form and related screen in keeping with the present invention;

FIG. 19 depicts a preview of an audit form generated by software of the present invention;

FIG. 22 depicts exemplary general procedures and related screen applicable to all audit areas of an audit;

FIG. 23 depicts the exemplary general procedures and related screen shown in FIG. 22 with associated generated forms, initials to indicate the procedures is completed, and comments regarding how the procedure was completed;

FIG. 24 depicts adding a generated form to the exemplary general procedures shown in FIG. 22;

FIG. 25 depicts a screen for manual navigation to audit areas;

FIG. 26 depicts a screen for displaying an audit program for the audit area called Accounts Receivable and Sales;

FIG. 27 depicts a screen having a pop-up menu for adding external work papers to an engagement;

FIG. 28 depicts a screen showing example spreadsheets added to the engagement;

Figure 29:
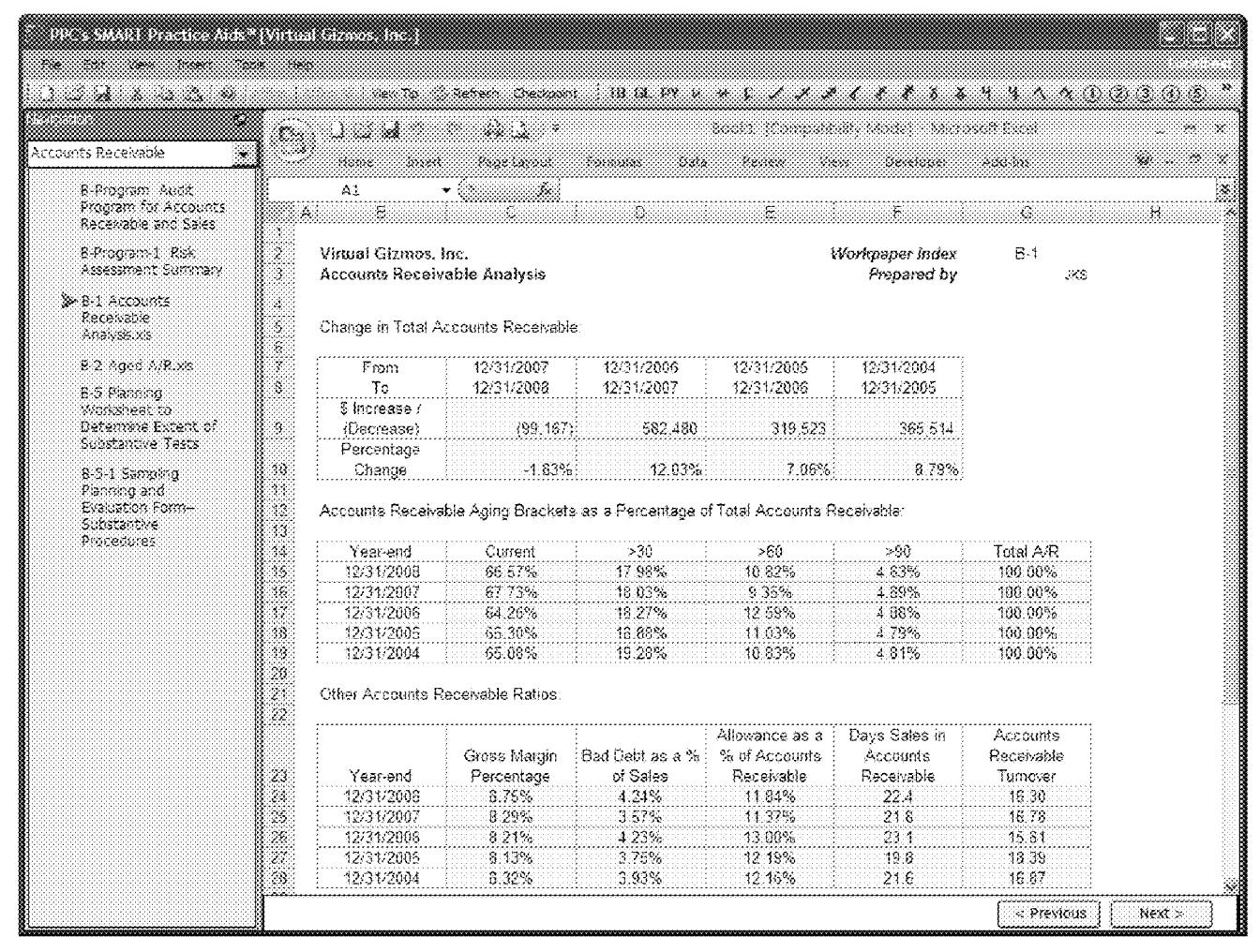

FIG. 29 depicts a screen showing an example spreadsheet launched by the system;

FIGS. 30-32 depict screens showing the sharing of audit information among work papers for further decision making;

FIG. 33 depicts a screen having a diagnostics menu option for use with, the entire audit engagement, including field work and planning portions of an audit;

FIGS. 34-35 depict screens showing the providing of navigation through the audit procedures.

FIG. 36 depicts a screen showing the filtering and presenting of audit procedures by assertion.

FIG. 41 depicts a screen showing a the result of SMART documents being placed into the external engagement management system;

FIG. 42 depicts a screen showing a view of data content included in a SMART document displayed in read-only mode;

FIG. 43 depicts a screen allowing editing of a SMART document; and

FIG. 44 depicts a screen showing a SMART document displayed in editable form.

Like reference symbols in the various drawings indicate like elements.

DETAILED DESCRIPTION OF THE PREFERRED EMBODIMENT

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

In one respect, the invention provides a professional services audit tool that includes an application that performs a variety of functions such as completing certain audit planning processes/forms (including assessing risks related to the financial statements being audited), offering a tailored set of audit programs based on the assessed risks, allowing users to further tailor the suggested audit programs, and rendering these audit programs in a helpful format, e.g., Thomson Corporation's PPC SMART e-Practice Aids format. In one manner, to use the application, each user also must own and have a valid license installed of an associated "practice aid," e.g., Thomson's e-Practice Aid product. In this example, the practice aid corresponds to one of eleven audit types, also referred to herein as "titles." An exemplary list of audit types or titles that are supported by the Risk Assessment system of the present invention includes: Guide to Audits of Nonpublic Companies; Guide to PCAOB Audits (i.e., audits of publicly-traded companies); Guide to Audits of Nonprofit Organizations; Guide to Audits of Local Governments; Guide to Audits of Employee Benefit Plans; Guide to Construction Contractors; Guide to Dealerships; Guide to Audits of Financial Institutions; Guide to Homeowners' Associations and Other Common Interest Realty Associations; Guide to HUD Audits; and Guide to Single Audits (audits that comply with government and non-profit "single audit" rules, regulations and guidelines). One advantage of this embodiment of the invention is that it enables a user to obtain a greater understanding of the entity under audit or review and its environment, review internal control, perform a more rigorous risk assessment, provide linkage of assessed risks of material misstatement (RIMM) to the user's audit procedures at the assertion level, and meet new and expanded documentation requirements.

Figure 1:
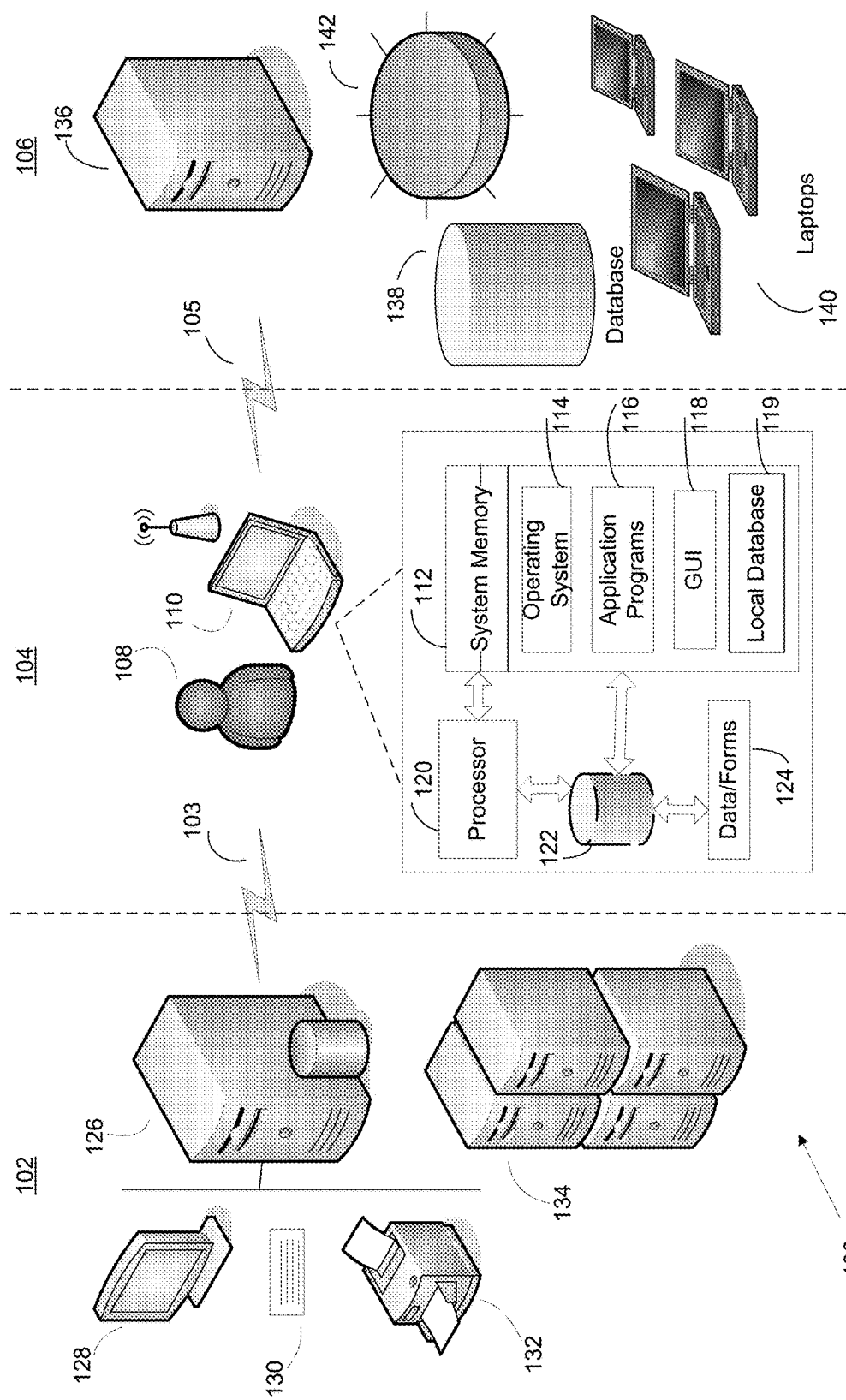
FIG. 1 depicts an exemplary system embodiment of the present invention.

Referring now to FIG. 1, a system 100 is shown for implementing a risk assessment and audit program and providing a tool that creates and generates audit procedures based on risk assessments and assertions identified during an audit. The system 100 comprises a central side 102, a remote audit work station 104 and a local client-side facility 106. In this example, a user 108, such as a professional conducting an audit, may use a mobile or local device, such as a wireless-enabled notebook computer 110 to connect to the central side 102 and/or the client side 106 via communication links. This configuration is one of many and is not limiting as to the invention. For example, in one alternative configuration user 108 may use the application fully self-contained within a desktop environment, e.g., as shown within 104, and may utilize a local database 119, such as SQL 2005 or above or SQL Express or other suitable database. The communication links may be a combination of wireless, LAN, WLAN, ISDN, X.25, DSL, and ATM type networks, for example. The user notebook 110 may comprise a typical combination of hardware and software including system memory 112, operating system 114, application programs 116, graphical user interface (GUI) 118, processor 120, and storage 122 which may contain electronic information 124 such as forms, practice aids, titles, data, procedures and the like. The operating system 114 shall be suitable for use with the risk assessment functionality described herein, for example, Microsoft Windows Vista (business, enterprise and ultimate editions), Windows 2000 with SP4 or Windows XP Professional with SP2. Also, the risk assessment invention may be browser-based and/or may include custom integration with Microsoft Office applications, e.g., Outlook, Word and Excel. Application programs 116 may include, for example, Microsoft Office 2007, Office XP with SP2, or Office 2003 with SP1 applications. The software and related tools, procedures, forms and data used to implement the risk assessment processes may be accessed by the machine 110 via the Internet or it may be loaded onto the machine via CD-ROM or other media or a combination of such means. The system requirements in one embodiment may require the machine 110 to be compatible with minimum threshold levels of processing capabilities, e.g., Intel Pentium III, speed, e.g., 500 MHz, and other parameters.

For purposes of discussion, an exemplary central side 102 may comprise a central server and database 126, user interface peripherals such as drives (not shown) monitor 128, keyboard 130, and printer 132. The central server and database 126 may be used to communicate remotely, or locally for that matter, with the user's machine 110 and may load, pass, receive information and instructions, such as software executable on the machine 110 and data, forms, titles, guides, procedures and the like for storing and using locally by the user on machine 110. A communication link 103 may be established between central side 102 and user workstation 104 for updating data and software used by the user during auditing processes. The central side 102 may also include one or more application servers 134 and other devices to help facilitate the exchange of software and data between the user 108 and the central side 102. The central side 102 may be associated with a professional services company, such as an accounting firm, in the business of conducting audits.

The local client-side facility 106 is illustrated for exemplary purposes only as including a server 136 or the like to provide a communication link 105 between the user machine 110 and the client-side system as required, if at all, in the auditing process. The client-side facility 106 may include a network 142 of computers 140, such as over a LAN, WLAN, Ethernet, token ring, FDDI ring or other communications network infrastructure. The client-side facility may also include a database 138 or other data storage component. In conducting an audit of a company associated with facility 106, the user 108, in one optional manner, may access data and/or the network 142 as necessary to review documents and processes of the company to prepare assessments and identify risks associated with company operations. In conducting and completing the audit engagement, the user 108 inputs data, calls upon audit tools, such as titles and procedures stored locally or remotely at the central side 102.

The system 100 may be Internet or (World Wide) WEB-based, desktop-based, or application WEB-enabled. Also, the present invention supports a "disconnected use" of the software in that the software may be designed so that a user 108 does not write back to the central server database 126 and/or the local database 119 until the user chooses to "save" or store the changes. Prior to saving changes, the user 108 may work in short-term memory. This feature has the benefit of allowing the user 108 to perform "what if" scenarios and examine results of these scenarios.

Figure 2:
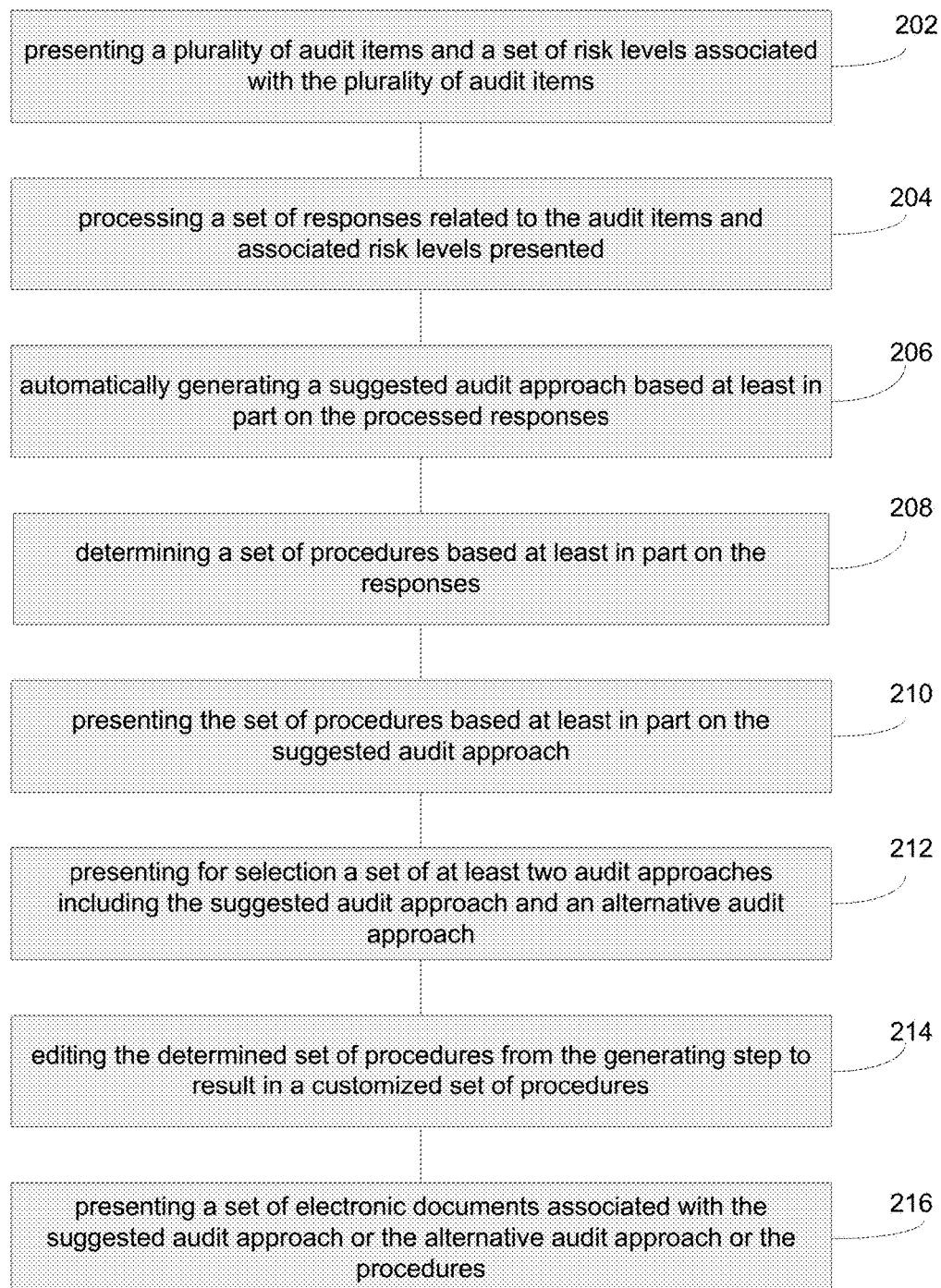
FIG. 2 depicts a flowchart illustrating one embodiment of the present invention.

FIG. 2 is a flowchart illustrating an embodiment of the invention that provides a computer-implemented process 200 for assessing risks associated with an audit. The process 200 includes the step 202 of presenting to a user a plurality of audit items and a set of risk levels associated with the plurality of audit items. Presenting step 202 may further comprise presenting a plurality of prompts designed to elicit a set of responses from a user/auditor wherein the set of user responses are associated with a set of risks associated with the audit. Further, the set of risk levels may be associated with a set of assertions associated with the plurality of audit items. Also, the set of risk levels may include at least a first risk level and a second risk level of different degrees of risk. Step 204 is processing a set of responses received from the user in response to the items presented in step 202. In step 206 the process automatically generates a suggested audit approach that is based at least in part on the processing step 204.

Still with reference to FIG. 2, the process 200 may optionally include one or more of the following steps. In step 208, the process includes determining a set of procedures that are based at least in part on the responses from step 204. At step 210, the set of procedures are presented to the user based at least in part on the suggested audit approach of step 206. The process may also include step 212 whereby a user is presented a set of at least two audit approaches comprising the suggested audit approach and an alternative audit approach from which the user may select. In addition, the suggested audit approach may be one of basic, limited or extended. In the process 200, each response in the set of responses may be a selected risk level from the set of risk levels representing different levels of risk. The presenting step 206 may include presenting an electronic audit form associated with the audit being performed by a user. The electronic form may comprise the plurality of audit items and the set of risk levels. The automatically generating step 206 may further include determining a set of procedures based at least in part on the set of user responses and the suggested audit approach may include presenting the set of procedures. The process 200 may also include step 214 of editing the determined set of procedures from the generating step 206 to result in a customized set of procedures. The process 200 may also include step 216 of presenting a set of electronic documents associated with the suggested audit approach.

The process 200 may be performed in a variety and combination of environments and architectures, including Internet/WWW-based applications, desktop applications, and WWW-enabled applications. In one exemplary architecture, a user 108 at a remote workstation 110 may have executing thereon software so that the user is not writing back to the central server database 126 until the user 108 chooses to save changes made. Until the changes are saved, the user is working in short-term memory and the user has the ability to perform "what if" scenarios.

Figure 3:
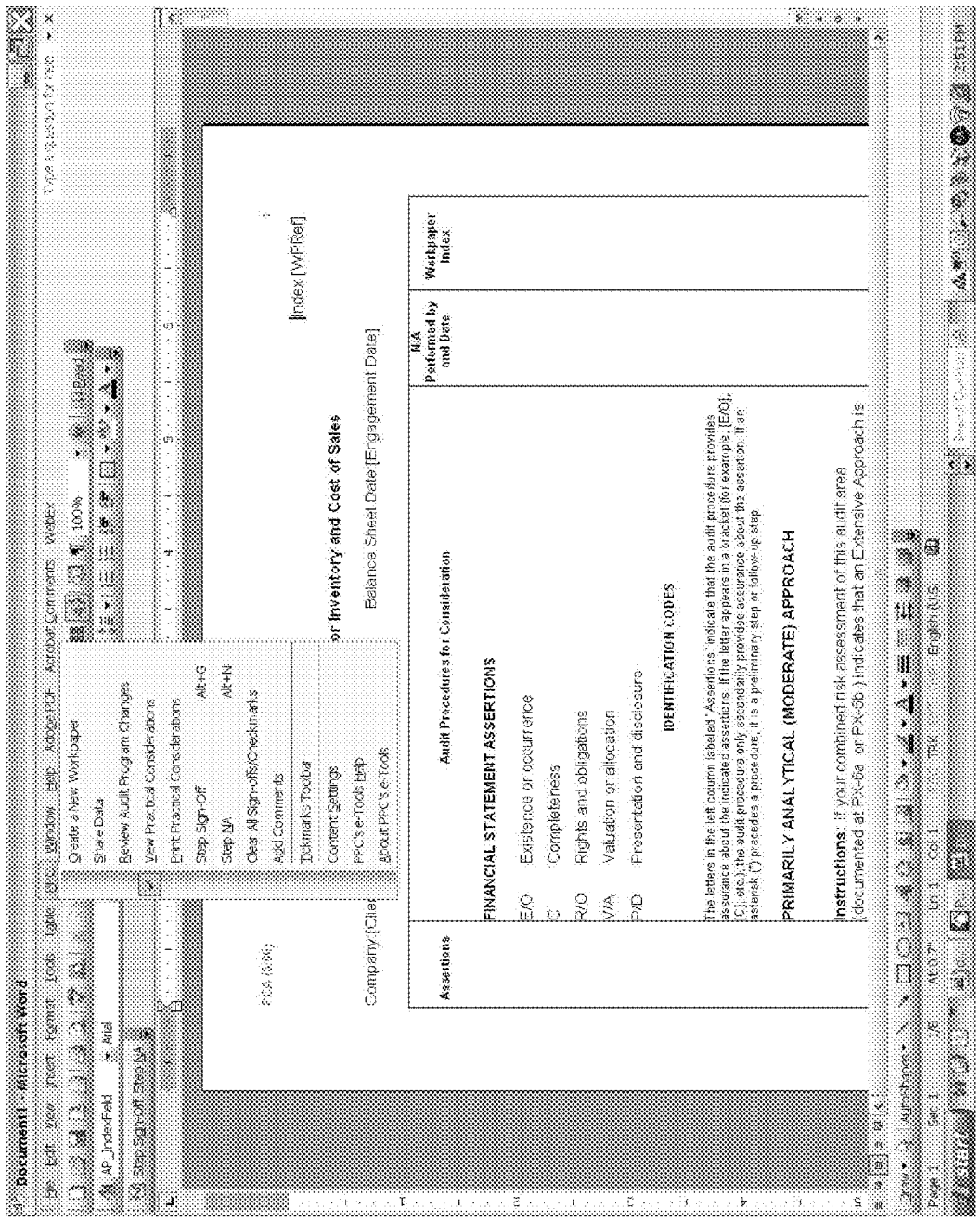
FIG. 3 depicts a screen shot illustrating exemplary functionality for use in conjunction with the present invention.

FIG. 3 is a screen shot of an exemplary practice aid comprising custom content and functionality built into the Word application. Shown is a menu representing custom audit functionality in the pull-down window with "View Practical Considerations" checked. Shown on the screen is represented the audit area "Inventory and Cost of Sales" in a practice aid form that provides direction and captures risk assessment information on Financial Statement Assertions (FSAs) and other data points.

Figure 4:
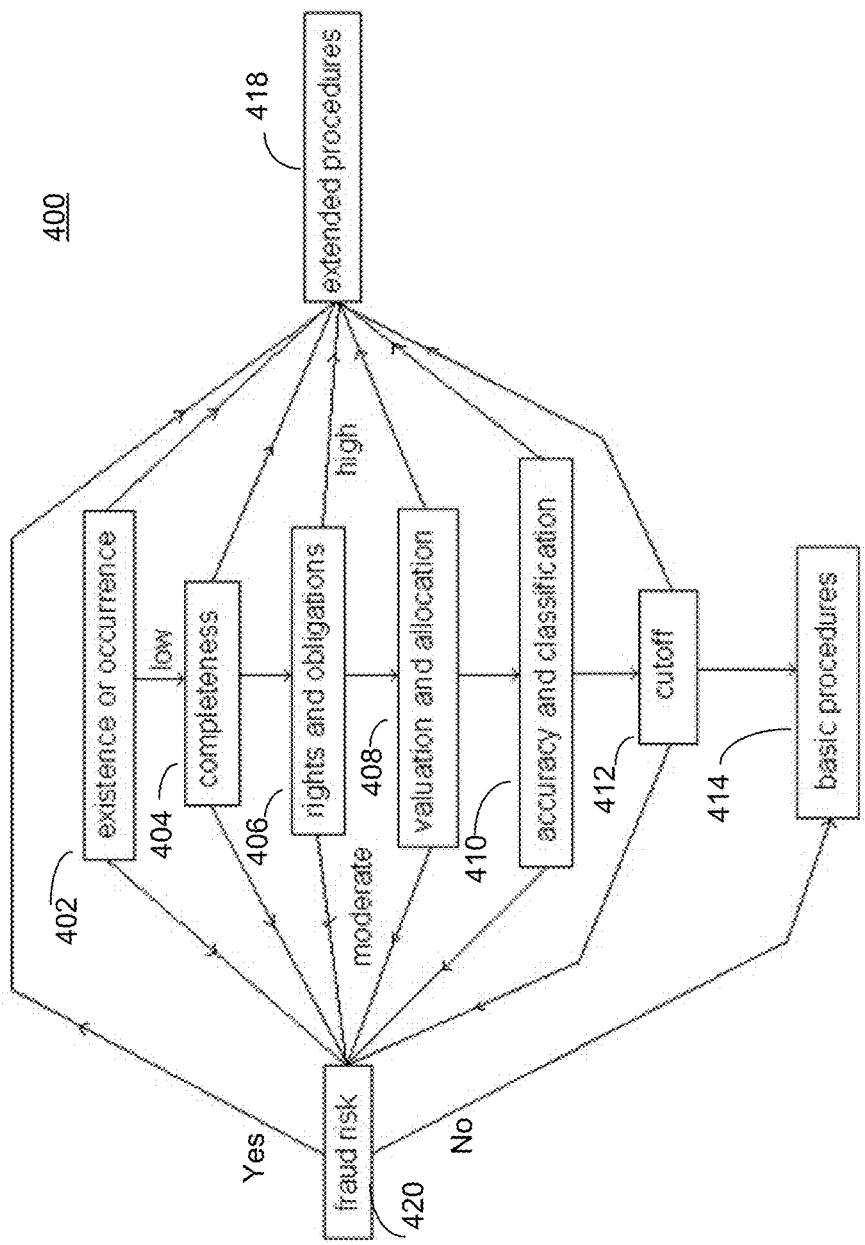
FIG. 4 depicts a flowchart illustrating a risk assessment aspect of the present invention.

FIG. 4 is a flowchart to help illustrate the logic 400 associated with assigning levels of risk associated with different assertions and how based on the assertions and assigned risk levels basic or extended procedures may be included in a suggested audit approach. Assertions 402 through 412 are similar to the FSAs of FIG. 3. For example, if all assertions 402 through 412 are assigned a low risk level then basic procedures 414 will be suggested. If some or all of assertions 402 through 412 are assigned a moderate risk level then basic procedures 414 will be suggested unless a separate significant or fraud risk 420 assertion is indicated. Whereas, if one or more of the assertions 402 through 412 are assigned high level of risk, then extended procedures 418 may be included in the suggested audit approach. A combination of basic and extended procedures may be included in a suggested audit approach.

With regard to initiating an engagement and with reference to FIG. 1, the GUI 118 may be used to present a user 108 with an introductory screen to interface the system of creating auditing procedures in response to a field of identified risks. For example, the introductory screen may give auditors or users 108 the option to begin a new engagement or continue an existing engagement. For example, the auditor 108 may begin a new engagement by either clicking on a page icon on a command bar or going to pull-downs, e.g., "file">>"new," Once an auditor 108 begins a new engagement, GUI 118 may present the user with a subsequent screen to allow the auditor 108 to input client information. For instance, the auditor may input the client's name, a particularized name for the engagement, and an audit type or title, e.g., a Thomson e-Practice Aid Title, which may be in the form of Microsoft Word and Excel documents, checklists and templates. The risk assessment process of the present invention allows users to identify risks of material misstatement and may be integrated with professional tool applications and suites of applications, for example, Thomson Corporation's e-Tools™ Suite, including PPC's e-Practice Aids, e-Workpapers, Interactive Disclosure Libraries, and Engagement Letter Generator products. The risk assessment invention may also involve internal control processes or information and may involve assessing control risks. The risk assessment process may include a performance and reporting aspect involving evaluating acceptance and involve accessing external resources such as Hoover's reference. This may also include evaluating continuance in the context of roll-forward acceptance and continuance decisions.

For example, an auditor may select a client's name from a drop-down box where client names are presented. Alternatively, an auditor may input a new unique entry directly into the client's name data field. An audit title is selected from a list of available choices, examples of which are provided above, which includes "Audits of Nonpublic Companies." In one implementation, an auditor may be limited in the selection of practice aid titles. By limiting the number of practice aid titles, the software may be managed according to the practice aid title. An auditor determines whether the engagement is an initial audit or whether it is related to a previous audit. Managing an audit in this way is beneficial because it allows an auditor to work on an audit in stages and determines whether initial audit procedures are automatically included.

FIGS. 5 through 21 and the following text provide a more detailed description of the engagement and risk assessment process. The computer-implemented audit tool described herein allows auditors to complete audit planning documentation, identify and capture audit risks affecting the engagement, automatically and dynamically generate suggested audit programs, select from suggested and alternative audit strategies responsive to auditor risk assessment, customize audit program aspects with user-friendly GUI and drag and drop functionality, and produce tailored practice aids for the engagement. The risk assessment process also may include diagnostic capabilities to aid the auditor in identifying inconsistencies in the audit program. Additional features that may be implemented in keeping with the invention are the ability to roll-forward an engagement based on a prior period engagement and the ability to aggregate information from various tools and practice aids and implement changes to or additional risk assessment standards across an audit platform and multiple engagements. To a large extent the present invention may be used to automate the audit planning and risk assessment process, optimize judgments, improve linkage between audit risk and procedures performed, increase audit effectiveness and reduce risk, and increase consistency across audit engagements. The invention and its various features are described in more detail below.

In one embodiment of the invention, an auditor initiates an engagement and completes planning forms and identifies risks. Next the auditor assesses risks and determines audit strategies. Next, the system automatically generates an audit program and the auditor may customize the program. Next, the auditor may run diagnostics to identify inconsistencies. In more detail, after the engagement has been created or continued, as described above, FIG. 5 illustrates a screen shot presented to a user 108 of audit areas to be included in an audit for a particular engagement. FIG. 5 displays the audit areas to be included in the audit. Exemplary audit areas 30 may include cash, accounts receivables and sales, inventory and costs of sales, inventory observation, property, investments and derivatives, other assets, accounts payable and other liabilities, notes payable and long-term debt, income taxes, equity, and incomes and expenses. An auditor can choose whether each of these or other areas will be considered in an audit. Further, an auditor has the option of adding an audit area. When at least one or more of these areas are selected for inclusion in the audit, a series of questions and subsequent screens will be generated to facilitate the creation of a set of audit procedures to be completed by the auditor that are tailored to the audited entity. These audit areas act as the parameters for the audit report and will be the aspects upon which the risk assessment is calculated.

FIG. 5 shows an introductory screen for easy navigation of the audit process. It is not necessary that any stage of the process be conducted first once the engagement has been created. At all times an auditor may skip forwards and backwards in the leftmost navigation pane. The leftmost navigation pane consists of categories for the identification of risks, assessing the effects of those risks, review and modification of audit programs, and generating planning forms and audit programs. The introductory screen gives an auditor an understanding of the significance of each individual category and what the auditor is meant to accomplish in each category. The introductory screen further assists the auditor by offering a tutorial to assist the auditor in conducting the audit preparation.

Figure 6:
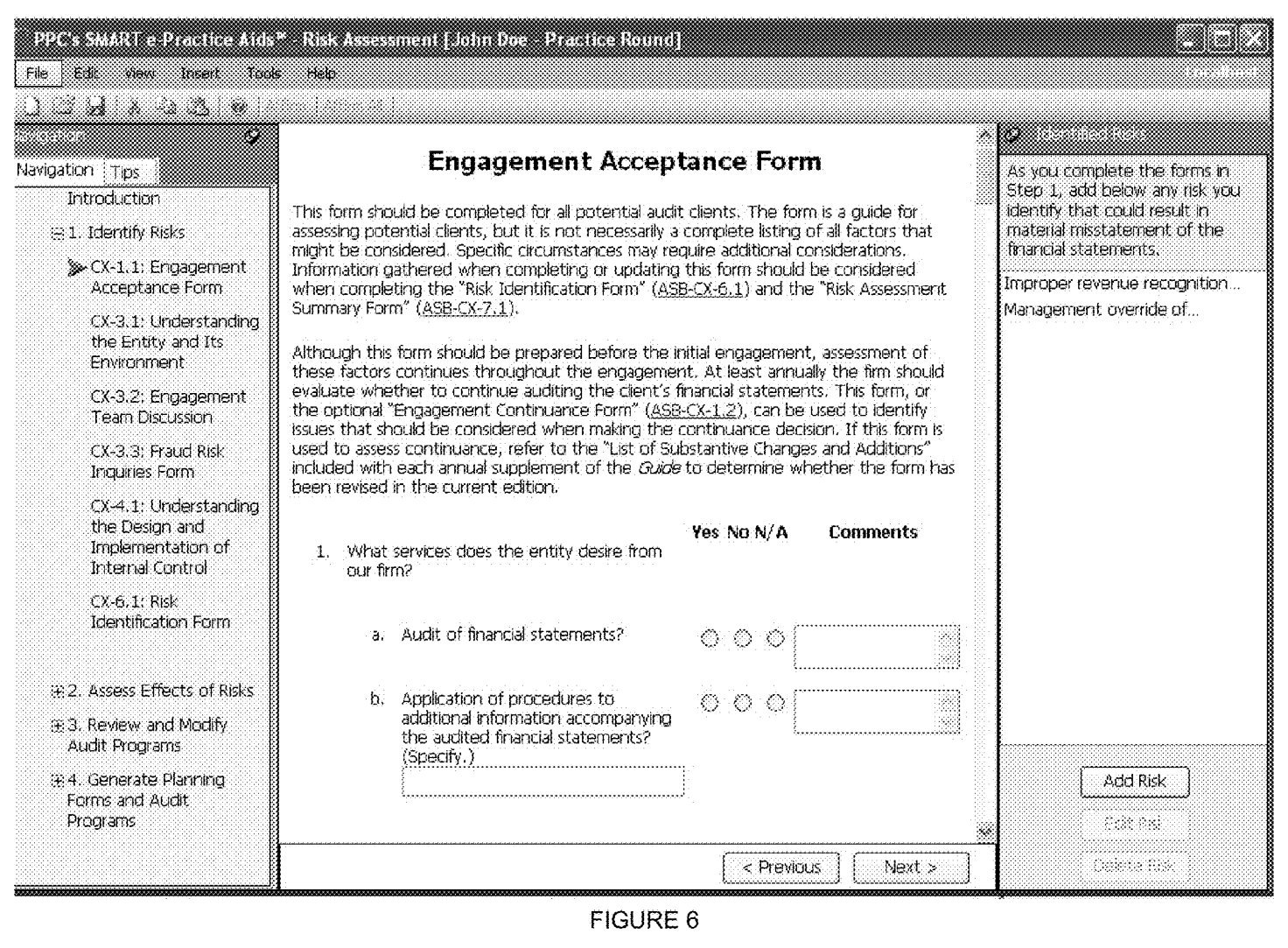

FIG. 6 depicts an engagement acceptance form screen having a navigation side pane and an identified risks side pane. This screen allows the auditor to give an initial assessment on whether they can perform the audit being requested. An auditor will input answers to questions such as the type of service being requested. Within the engagement acceptance form 60, there are practical considerations 61 identified in blue. An auditor can select to hide all practical considerations. Practical considerations consist of advice given to the auditor. The engagement acceptance form 60 also is designed for the input of brief description of the services to be performed by the auditor. Further, communications with the party seeking the audit are noted here. This screen also addresses any conflicts of interest to help ensure a professional and trustworthy report.

Figure 7:
FIG. 7 depicts a risk identification screen where an auditor may enter and describe a type of risk in keeping with the present invention.

FIG. 6 shows a right pane where an auditor may add specific identified risks. A risk might be identified at any stage of the audit, and the completion of engagement acceptance form. Understanding the Entity and its Environment form illustrated in FIG. 8 and similar forms provide bases for the auditor to identify applicable risks. An auditor clicks the "Add Risk" box in FIG. 6, and the screen of FIG. 7 appears. FIG. 7 depicts a fraud identification screen where an auditor may enter a type of risk and describe it in any way. The auditor will determine whether this risk is a fraud-related risk and whether it is significant enough to warrant special consideration. Similar to the engagement setup of FIG. 4, the auditor selects audit areas affected by the risk, or may select "overall financial statements" if all audit areas in the financial statements will be at risk.

Figure 8:
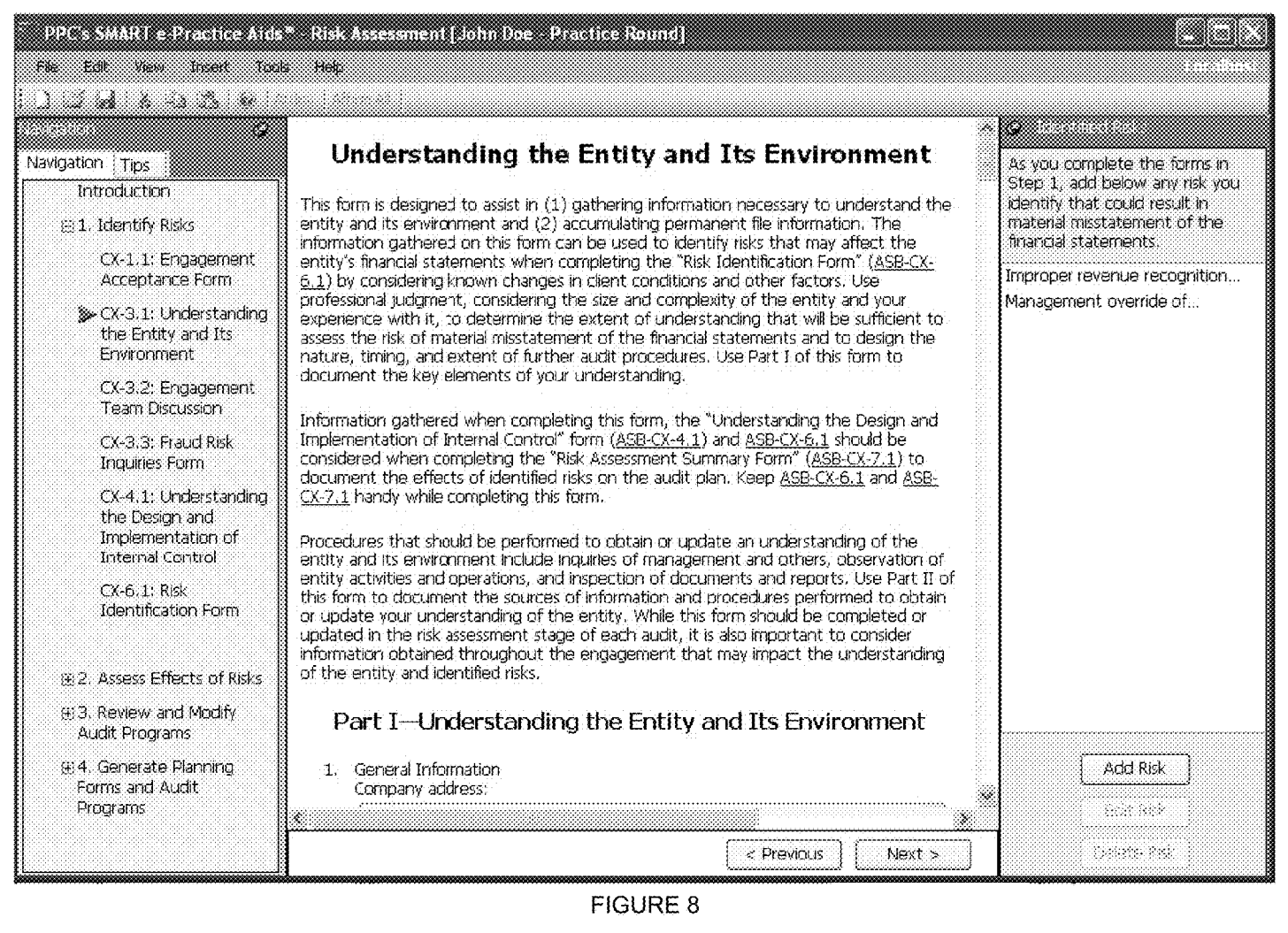

In FIG. 8, the Understanding the Entity and its Environment form and associated screen are directed to the goal of having the user better understand the entity being audited. When auditing a business, it is important that the auditor review not only the financial aspects of the business, but how the business operates and its financial plans. Here, the auditor inputs certain information about the entity being audited including their address, structure, ownership, governance. The auditor lists known transactions with related parties such as subsidiaries and other affiliated corporations. The auditor will input the type of industry in which the audited entity operates, including any applicable regulations which affect that industry. If one certain operations of the entity are being audited, the Auditor may explain what other operations the entity is engaged in.

Figure 9:
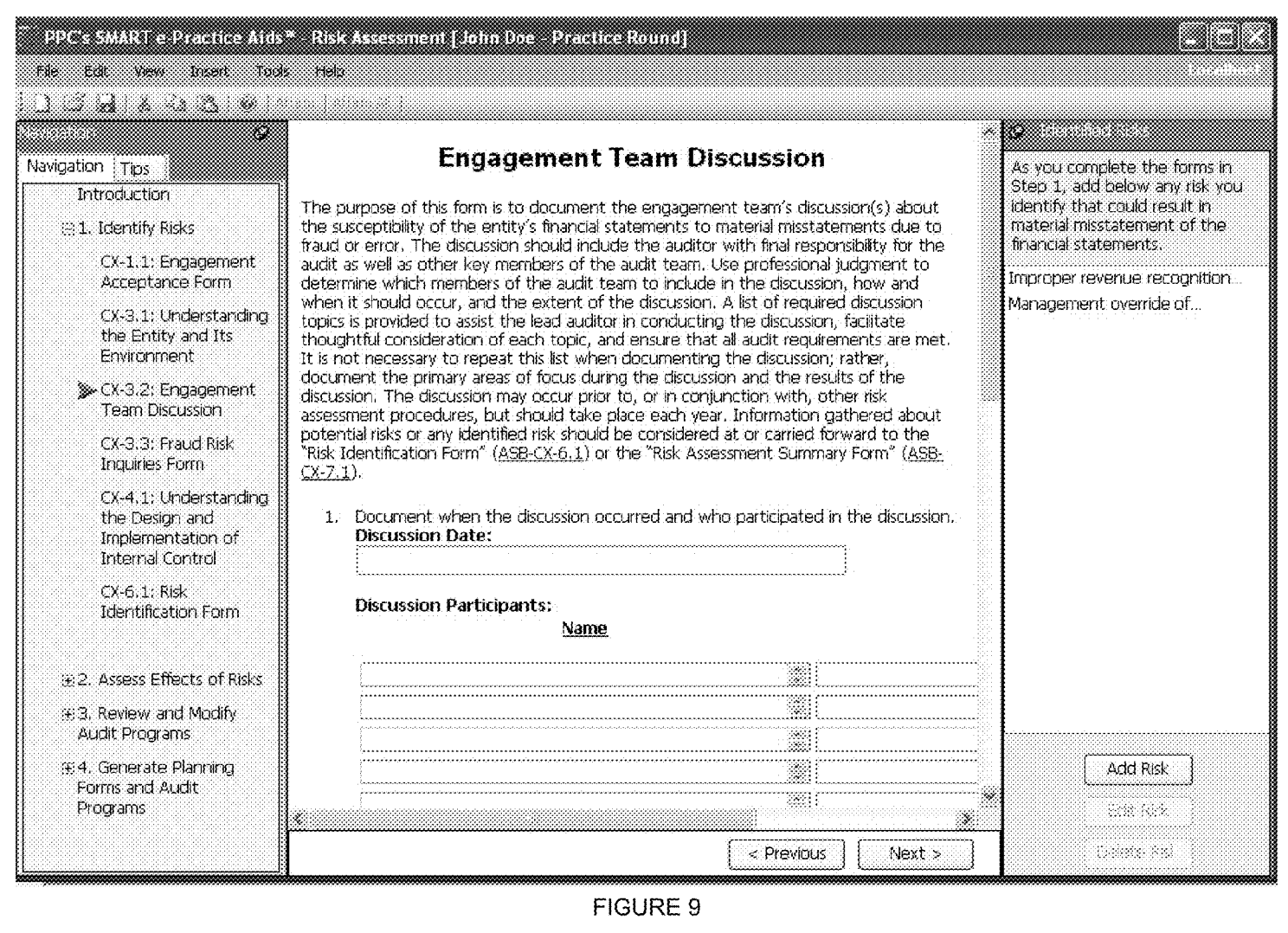

FIG. 9 depicts an Engagement Team Discussion form screen. The engagement team discussion form 80 screen allows the auditor to record the names of the persons authorized to disclose information about the entity. On this screen, the name and title of each person authorized to disclose information within this meeting would be recorded, as would all decisions resulting from this meeting.

Figure 10:
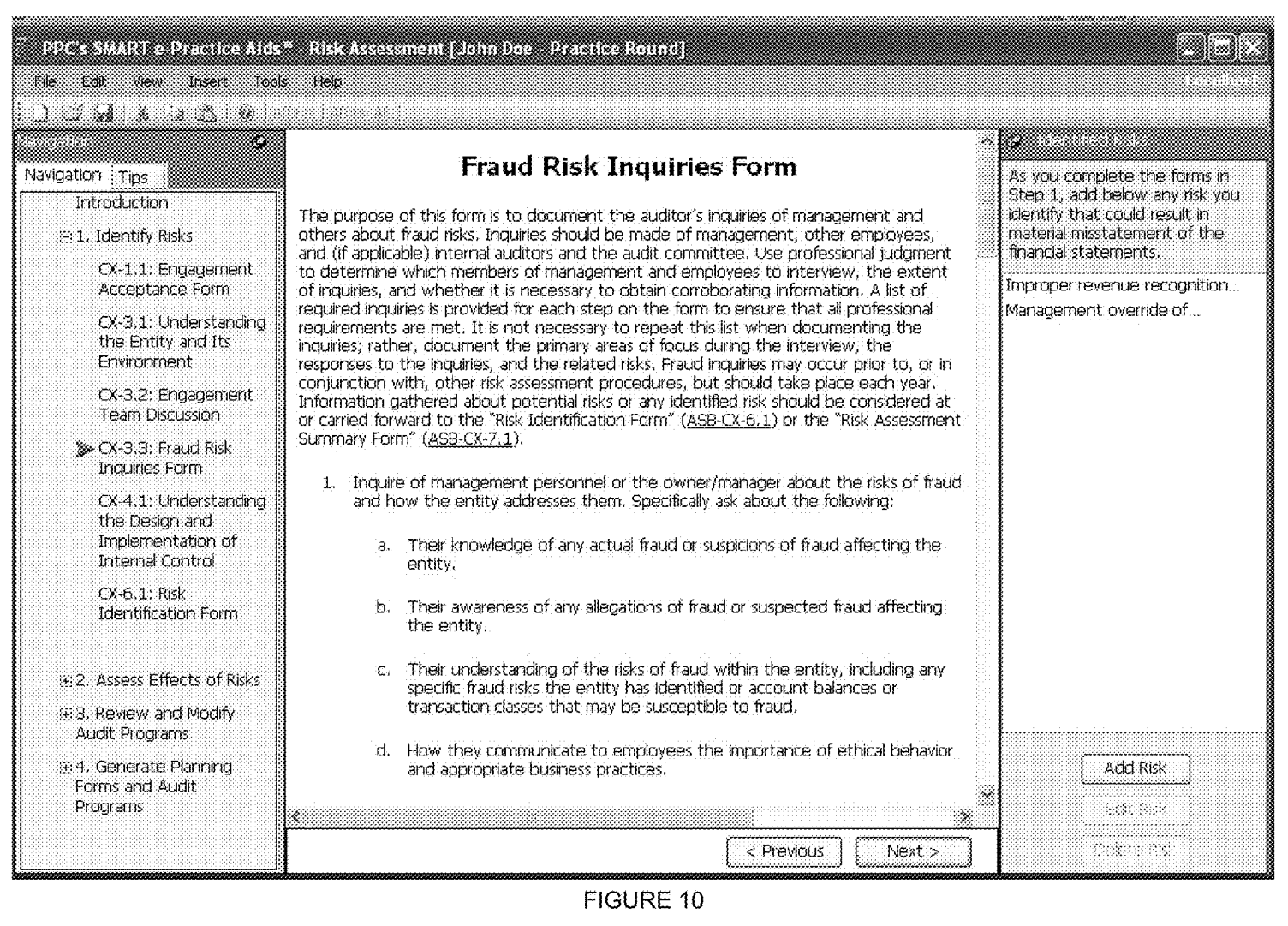

FIG. 10 depicts the Fraud Risk Inquiries Form screen. The auditor uses this screen to document the questions the auditor has asked selected employees of the entity and record their answers. This screen is for the bulk of the investigative functionality of the job of an auditor. The Fraud Risk Inquiries Form suggests questions as well as areas to consider when preparing questions.

Figure 11:
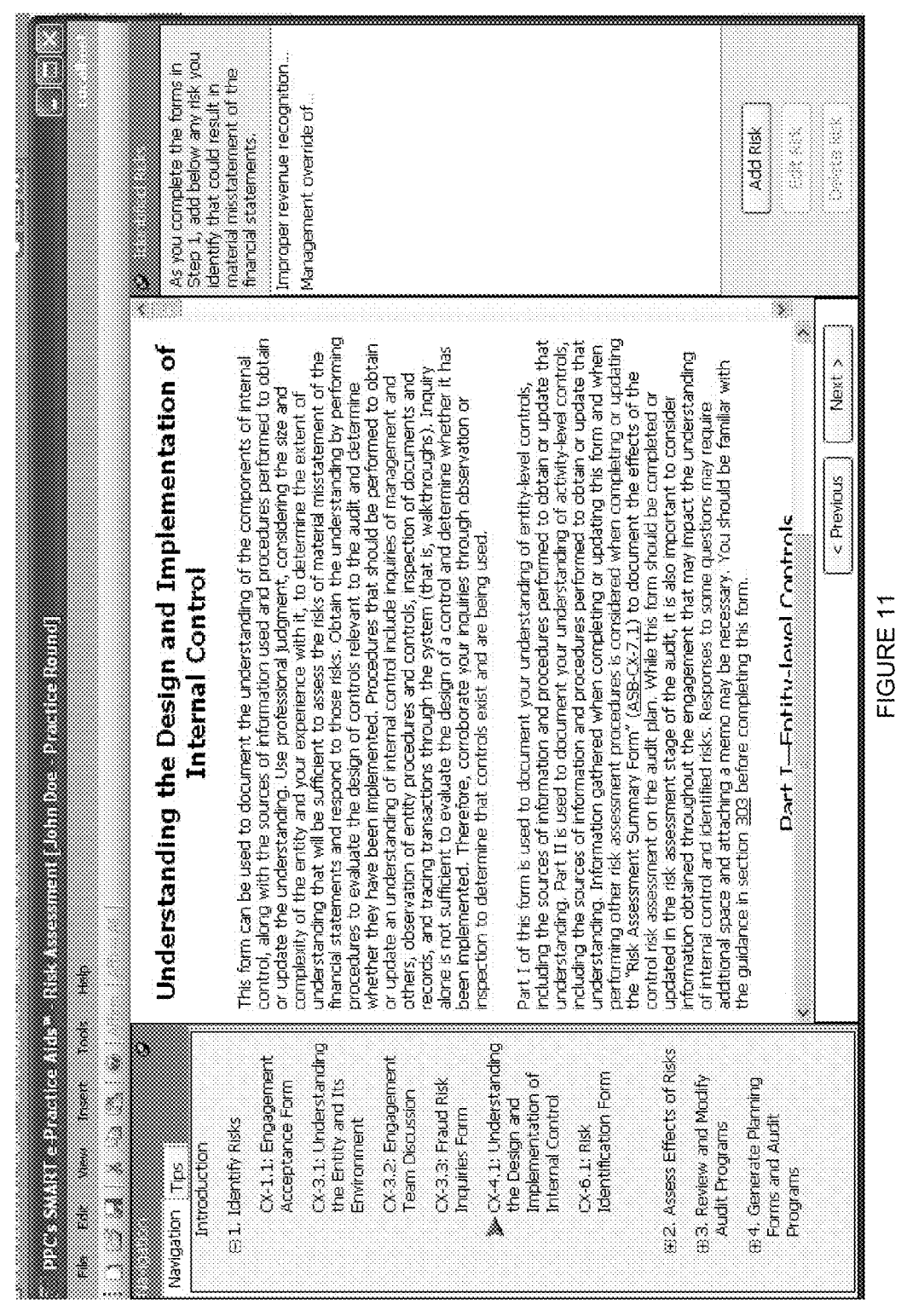

FIG. 11 depicts the "Understanding the Design and implementation of Internal Control form" screen. The auditor uses this screen to obtain a sufficient knowledge of the control environment to understand the attitudes, awareness, and actions of those governing the entity that relate to internal control and its importance in achieving reliable financial reporting and obtain a sufficient knowledge of the entity's risk assessment process to understand how management identifies business risks that may affect the financial statements and determines how to address those risks. The screen and overall system help auditors obtain a sufficient knowledge of the audited entity's internal control communication process to understand how roles, responsibilities, and significant matters related to financial reporting are communicated.

Figure 12:
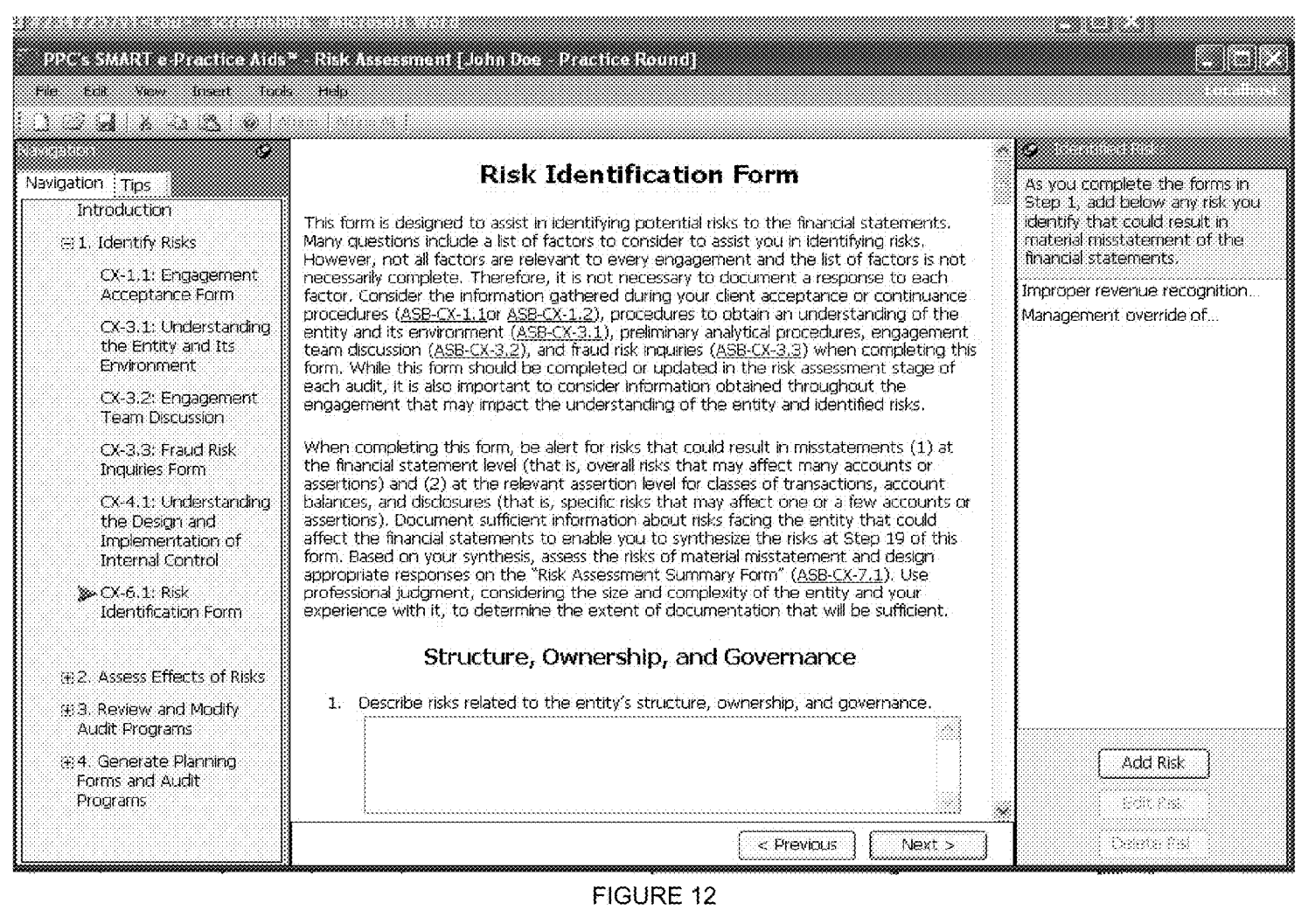

FIG. 12 depicts the "Risk Identification Form" screen. The auditor uses this form to identify potential risks in financial statements. Here, the auditor inputs risks related to the industry, the entity (including but not limited to its structure, its governance, its investment strategy), and indications of fraud.

Figure 13:
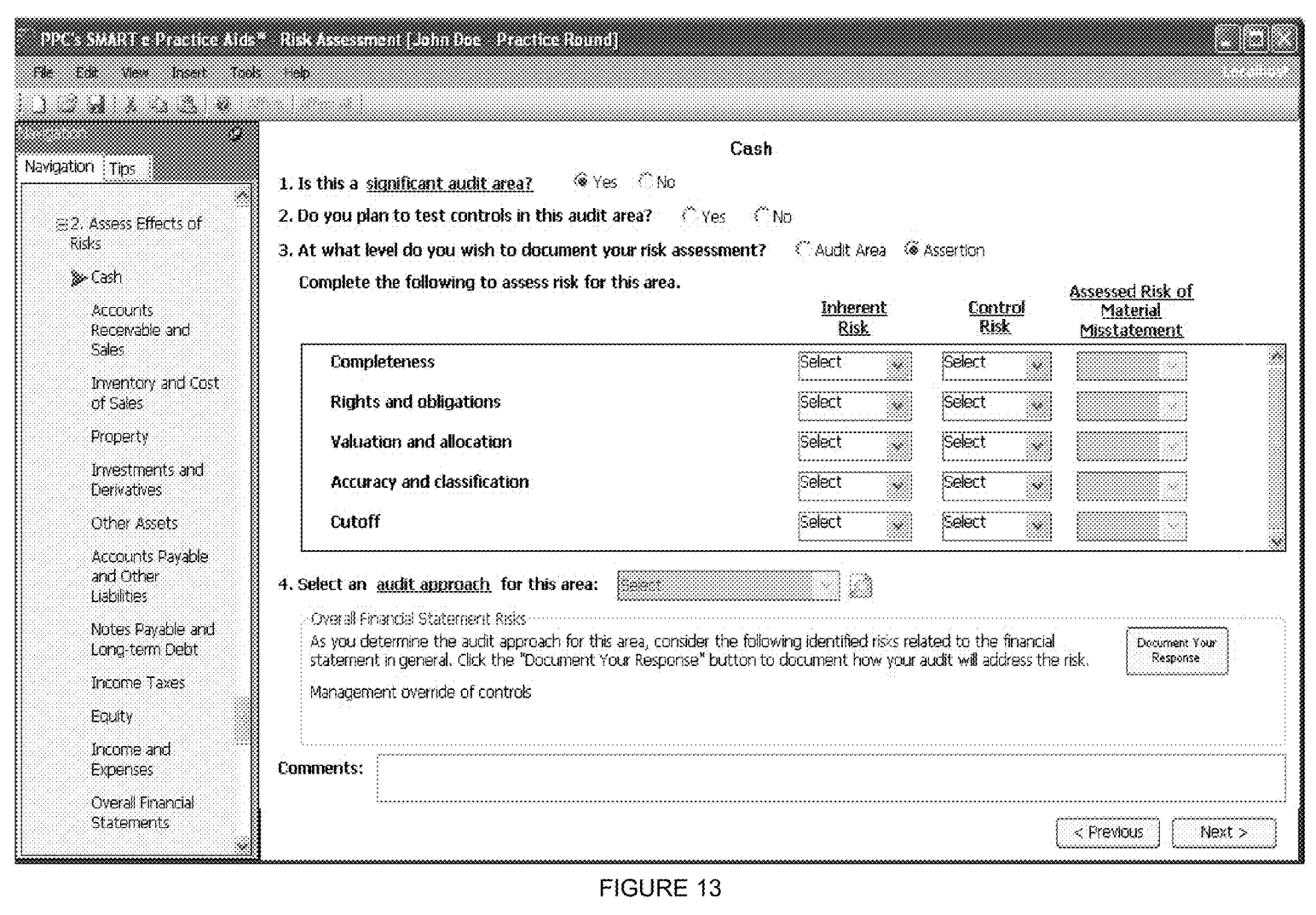

FIG. 13 depicts an initial risk assessment summary form. Risk assessment summary forms are the aspect of the present invention wherein users respond to predetermined questions with answers related to the risk of certain assertions. The presentation of identified risks and risk assessments in FIG. 13 may be referred to as the presenting step. Assertions are representations that are embodied in components being audited and include existence or occurrence, completeness, rights and obligations, valuation and allocation, accuracy and classification, and cutoff. There are three types of audit risk for which assertions must be made. The type of audit risks include inherent risk (IR), control risk (CR), and the assessed risk of material misstatement (RMM). The inherent risk is the susceptibility of a relevant assertion to a misstatement that could be material, either individually or when aggregated with other misstatements, assuming there are no related controls. The control risk is the risk that a misstatement that could occur in a relevant assertion and that could be material, either individually or when aggregated with other misstatements, will be not prevented or detected on a timely basis by the entity's internal control. The assessed RMM is the product of IR and CR and may be automatically calculated, but may be manually altered by the auditor. The risk levels inputted under IR, CR and RMM are of three levels, an example of which might be low, moderate and high, but is not limited to such terms.

As used herein, the term assertion means representations that are embodied in components being audited. For example, Statement on Auditing Standard No. 106, Audit Evidence (SAS No. 106), issued by the American Institute of Certified Public Accountants (AICPA), provides that assertions used by the auditor fall into the following categories:
  a. Assertions about classes of transactions and events for the period under audit:
    i. Occurrence. Transactions and events that have been recorded have occurred and pertain to the entity.
    ii. Completeness. All transactions and events that should have been recorded have been recorded.
    iii. Accuracy. Amounts and other data relating to recorded transactions and events have been recorded appropriately.
    iv. Cutoff. Transactions and events have been recorded in the correct accounting period.
    v. Classification. Transactions and events have been recorded in the proper accounts.
  b. Assertions about account balances at the period end:
    i. Existence. Assets, liabilities, and equity interests exist.
    ii. Rights and obligations. The entity holds or controls the rights to assets, and liabilities are the obligations of the entity.
    iii. Completeness. All assets, liabilities, and equity interests that should have been recorded have been recorded.
    iv. Valuation and allocation. Assets, liabilities, and equity interests are included in the financial statements at appropriate amounts and any resulting valuation or allocation adjustments are appropriately recorded.
  c. Assertions about presentation and disclosure:
  i. Occurrence and rights and obligations. Disclosed events and transactions have occurred and pertain to the entity.
    ii. Completeness. All disclosures that should have been included in the financial statements have been included.
    iii. Classification and understandability. Financial information is appropriately presented and described and disclosures are clearly expressed.
    iv. Accuracy and valuation. Financial and other information are disclosed fairly and at appropriate amounts.

SAS No. 106 provides that the auditor may use these relevant assertions as described above or may express them differently provided aspects described above have been covered. Standard setting bodies other than the AICPA also refer to other assertions in grouping that are similar to but that may differ from the grouping in SAS No. 106.

Assertions in the invention are summarized and presented in the following six groupings: existence or occurrence, completeness, rights and obligations, valuation and allocation, accuracy and classification, and cutoff.

FIG. 13 prompts the auditor to determine whether this audit area is a significant audit area 133. A significant audit area 133 is an audit area that contains a significant transaction class, a material account balance, requires significant disclosures, or contains a fraud risk or other significant risk.

Additionally, risks entered in FIG. 7 are displayed in the Risk Assessment Summary form of FIG. 13. These risks can be expanded by double-clicking the risk field. Only those risks that pertain to the audit area will appear in FIG. 13 for that audit area (e.g., a risk of fraud relating only to property will appear in FIG. 13 for that audit area (e.g., a risk of fraud property category and not the cash or any other category). A risk entered in FIG. 7 as a risk to the overall financial statements will appear in each category.

On FIG. 13 an auditor will then choose which audit approach to take. The present invention contemplates a variety of audit approaches including a limited procedures audit approach, a basic procedures audit approach and an extended procedures audit approach. Based upon the information inputted on the planning form, particularly the information inputted under the RMM, the risk assessment system will generate a suggested audit approach. In one manner of implementation, if any RMM assertion is high, an extended procedures audit will be suggested. Also, an alternative audit approach may be carried out by presenting and selecting an audit approach other than the suggested approach.

The limited audit approach consists of preliminary analytical procedures, other risk assessment procedures, and final analytical procedures considered sufficient. No audit program will be created for the audit area. This approach is not appropriate for significant audit areas. The basic audit approach is the audit that will be included in both the basic and extended audit reports. The basic procedures audit will include primarily substantive analytical procedures and certain tests of details required by auditing standards or regulations. This approach ordinarily is not appropriate to respond to a fraud risk or other significant risk. The extended procedures audit approach includes the basic procedures plus procedures for additional assurance related to assertions for which the auditor indicates there is a high RMM If there is a moderate RMM, extended procedures will be suggested if fraud or any other significant risks exist.

Risk Assessment Summary Forms exist for at least the categories cash, accounts receivables and sales, inventory and cost of sales, inventory observation, property, investments and derivatives, other assets, accounts payable and other liabilities, notes payable and long-term debt, income taxes, equity, and incomes and expenses, overall financial records, but is not limited to these categories.

Figure 14:
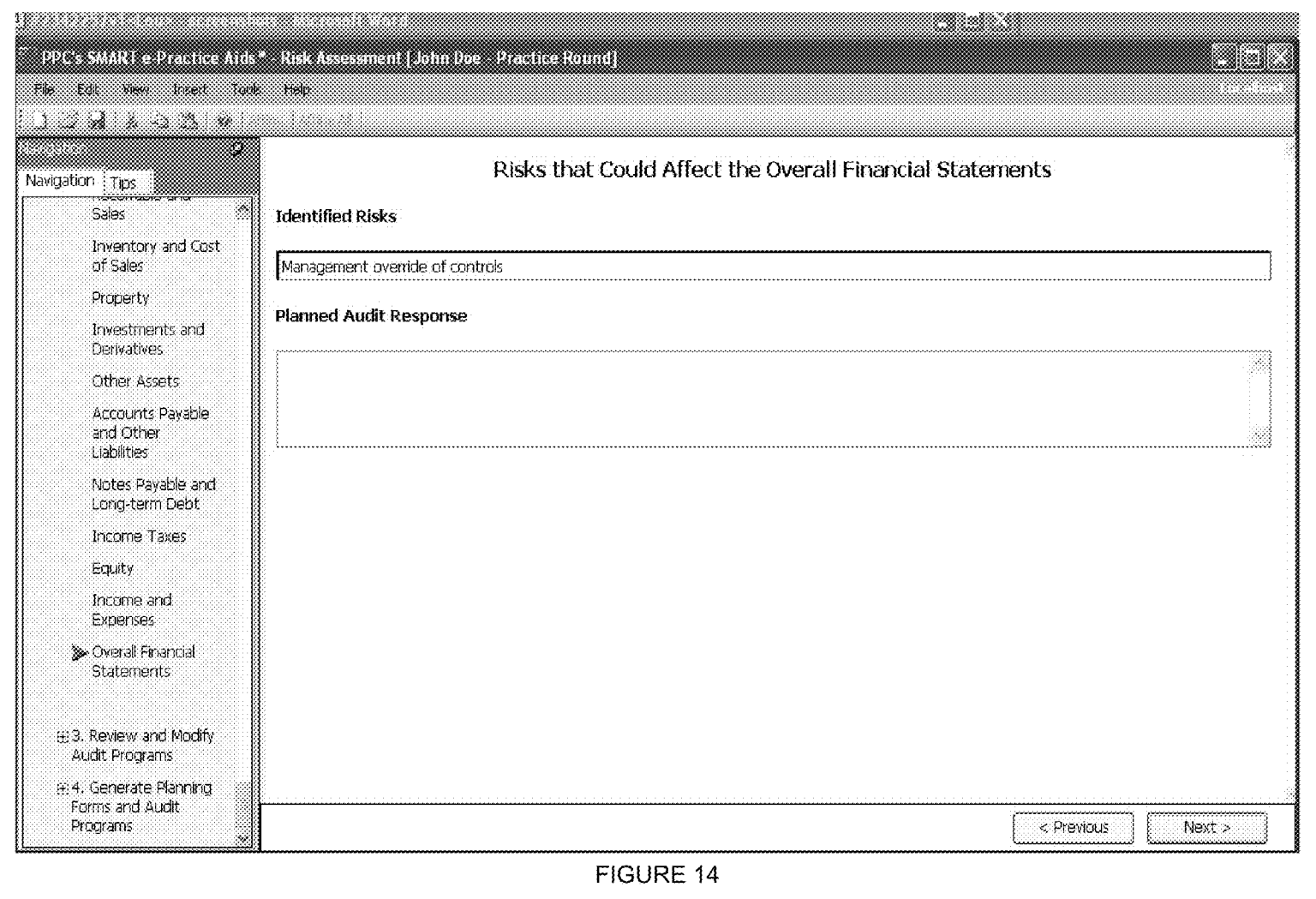

FIG. 14 depicts the risks entered in FIG. 7 as risks to the overall finance statements. This screen permits an auditor to list procedures relating to that particular risk factor. Allowing for specifically inputted risks gives the auditor flexibility in designing an audit procedures.

Figure 15:
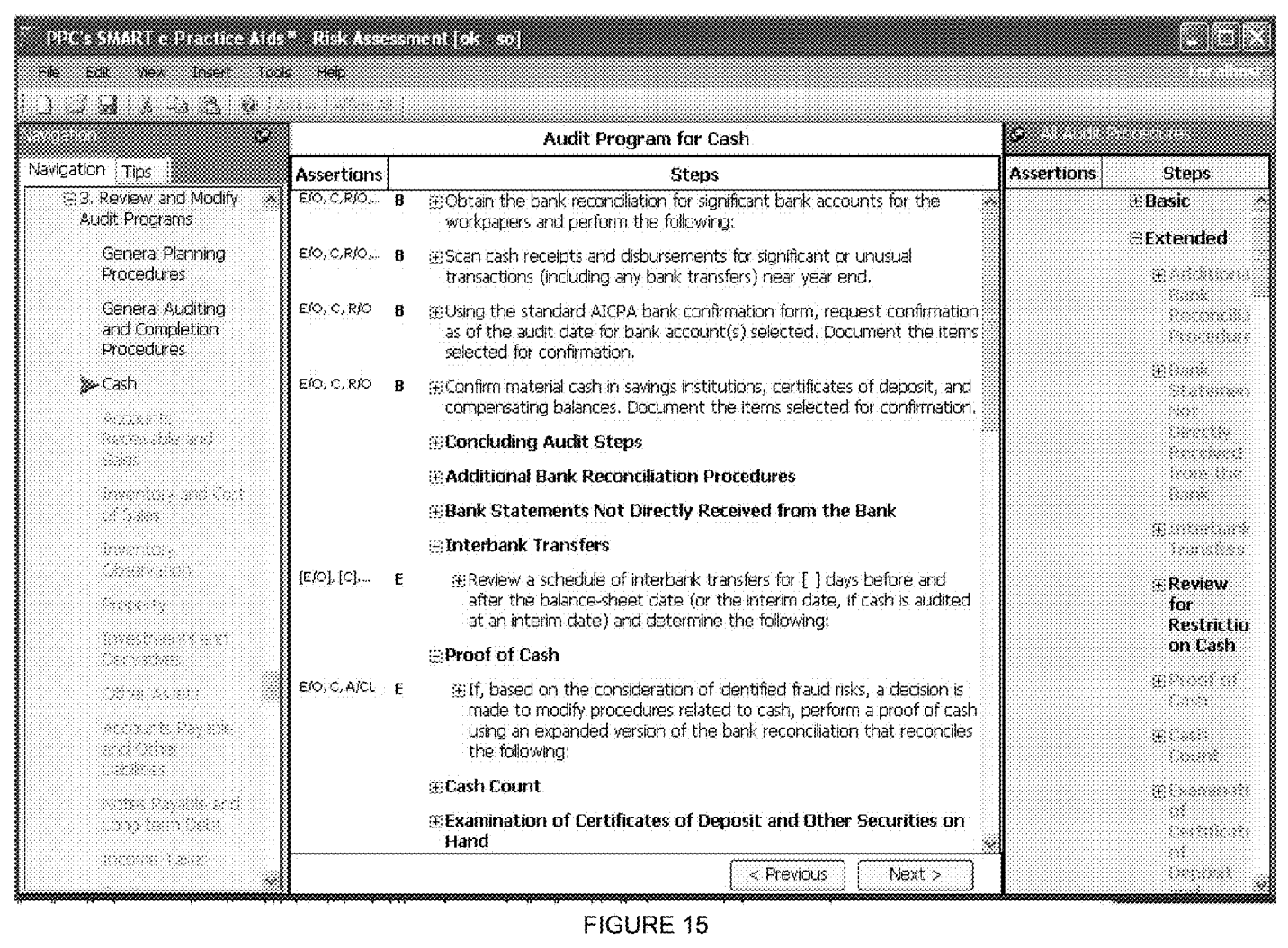

FIG. 15 depicts the procedures generated by inputted data. The risk assessment system of the invention generates procedures utilizing a logic scheme wherein answers or responses input by the auditor are used as input to the logic. The generation in this step is referred to as the automatically generating step. An auditor can alter the procedures as generated by the system. The procedures are displayed in a nested format using boxes an auditor may click to display the nested information. In the right pane, all available audit procedures are listed. This pane includes audit procedures included or excluded from the generated procedures in the center pane. Exclude procedures were excluded from the report because in response to the answers inputted the program deemed those procedures irrelevant. However, so that the auditor may have full control and ability to customize the report, the auditor may alter the procedures by dragging those procedures from the right pane into the list of procedures to perform in the center pane. Using drag and drop technology, the auditor is able to determine where in the center pane the new procedures is displayed. If an auditor wishes to change the location of the procedure within the center pane (both those automatically generated and those added by the auditor), the auditor can drag and drop that procedure into the right pane and that procedure will be removed. Further, the user can reorder the procedures in the report from this screen.

Figure 16:
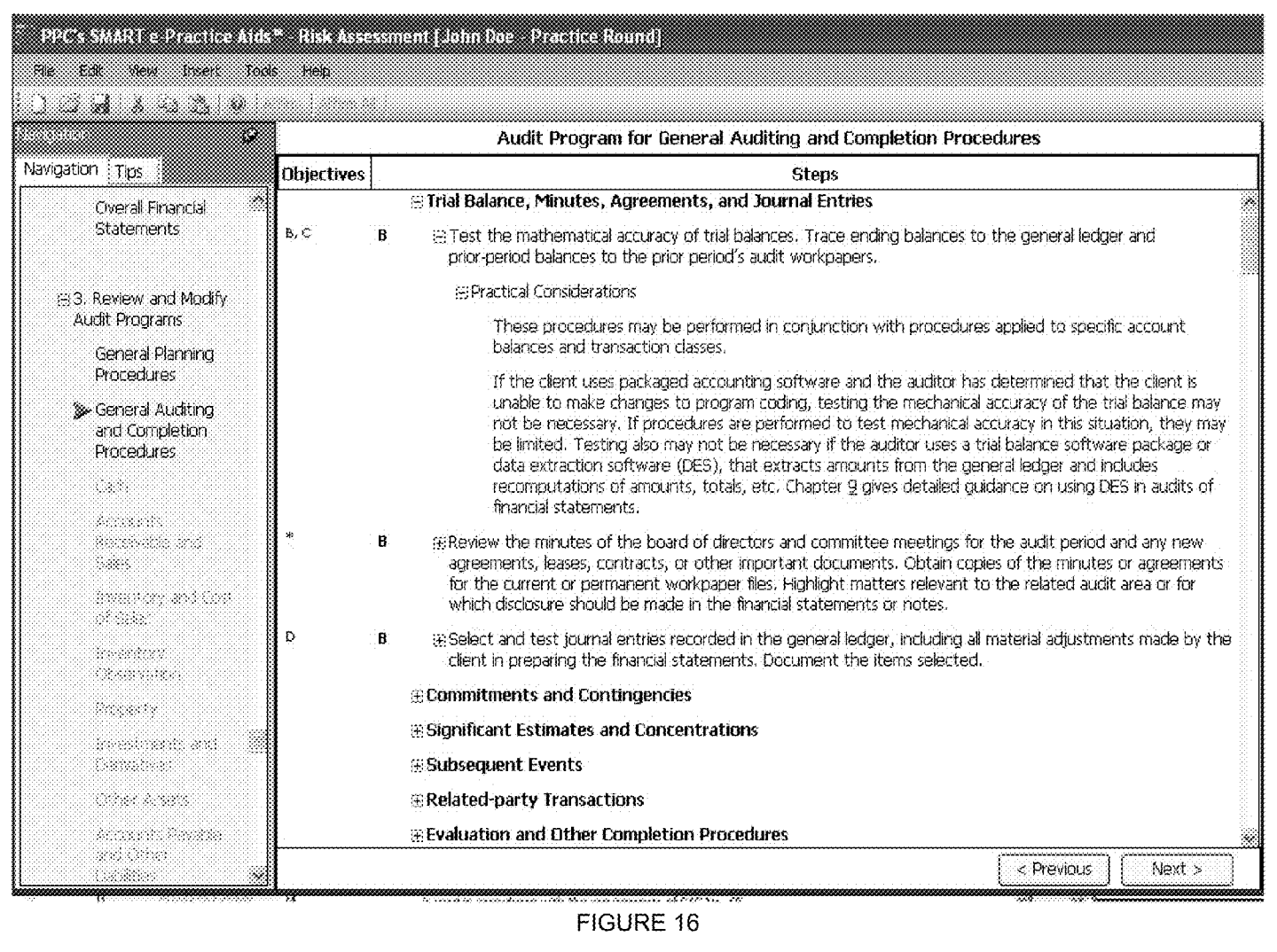

FIG. 16 depicts general procedures that are applicable to all audits. These procedures are displayed in the same structure as the steps of FIG. 15. Similar to FIG. 15, an auditor may drag and drop new procedures into place into the primary screen of FIG. 16. Likewise, the auditor may drag and drop procedures in FIG. 16 into the right pane to remove them from the audit report.

FIG. 17 depicts a diagnostic report. The diagnostic report of FIG. 17 lists potential errors as a result of information inputted by the auditor including failure to answer any portion of a planning form or failure to select an audit approach. This is especially useful because it alerts the auditor to issues that should be considered before documents are generated in FIGS. 18 and 21. To correct these errors, a user may either click through the left pane's navigation panel, or use the previous button.

Figure 18:
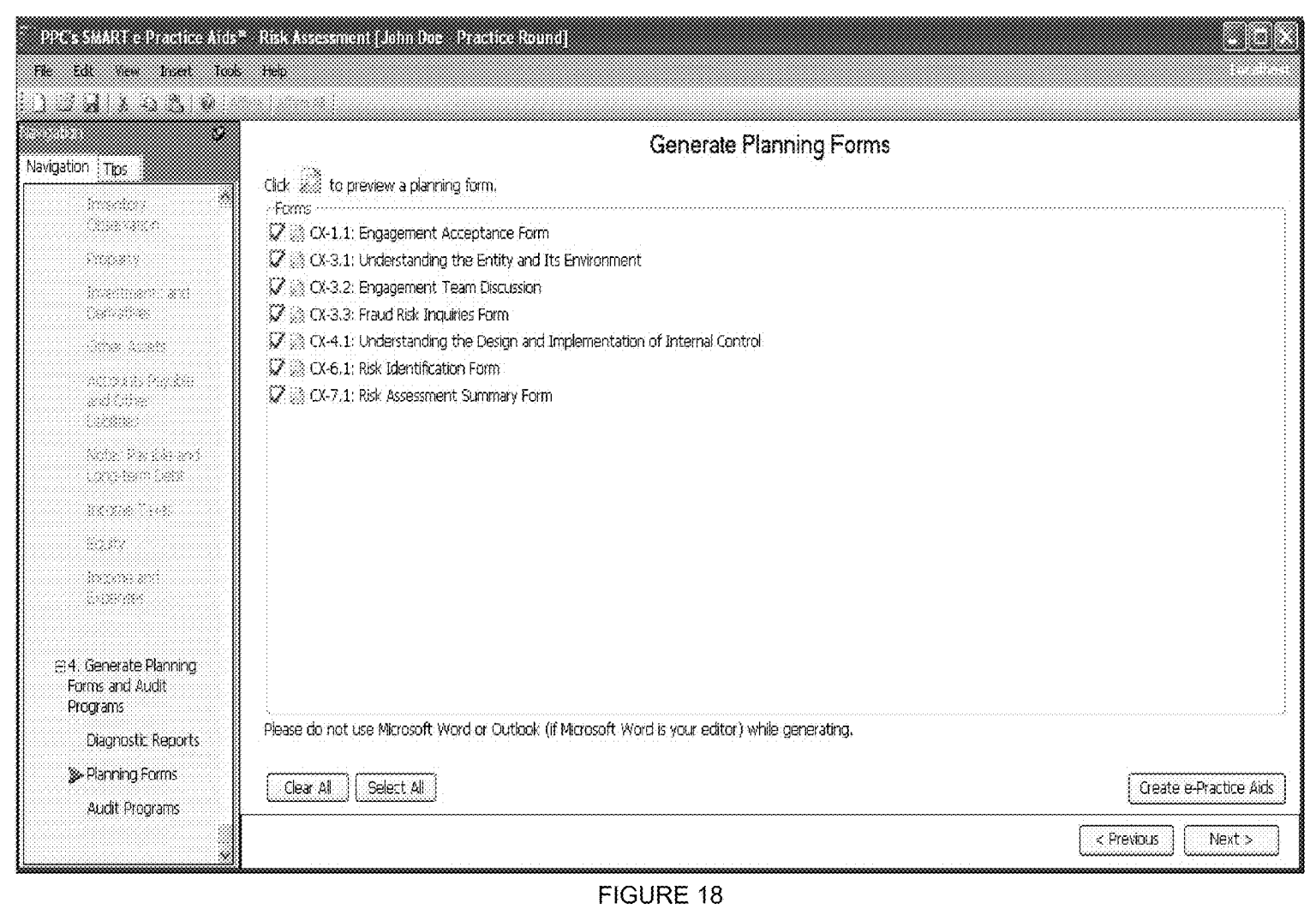
Figure 20:
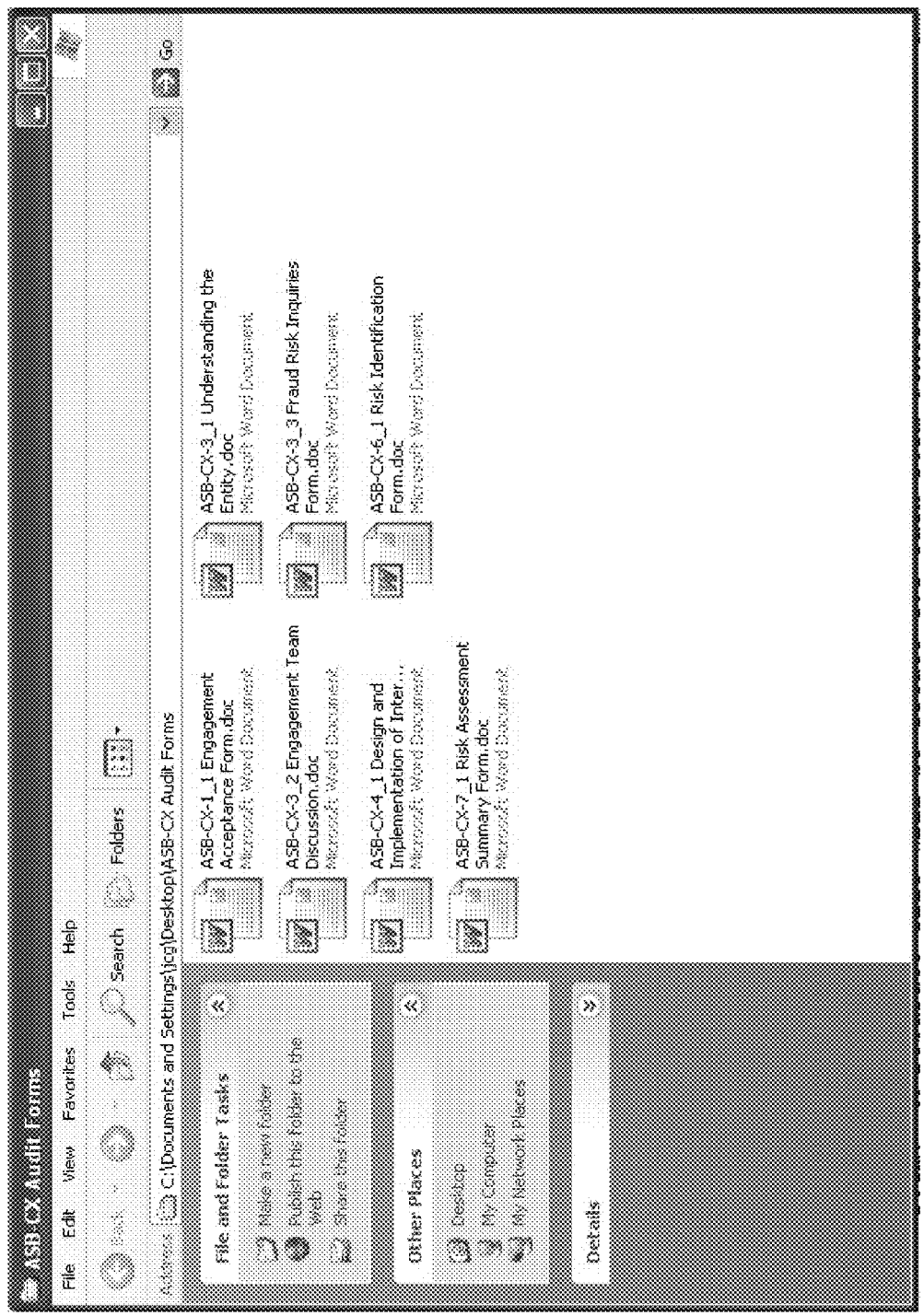
FIG. 20 depicts a file containing all forms generated by the program.

FIG. 18 depicts the generated audit forms. The audit forms correspond to the planning forms of FIGS. 6 and 8 through 13. An auditor may click on any of the forms to download a preview of the actual form. Alternatively, an auditor may click "Create e-Practice Aids" to generate audit documents as shown in FIG. 20.

FIG. 19 depicts a preview of an audit form generated by the system. The preview report generated allows the user to view the form before exiting the program. By creating the preview function, an auditor can review the form to ensure that all elements needed are present. Because of the easy navigation through the program using either the left pane or the "previous" button, an auditor can easily amend the form using the system software. The preview report appears just as the actual form will appear when printed. The preview mode does not display the practical considerations feature.

Figure 21:
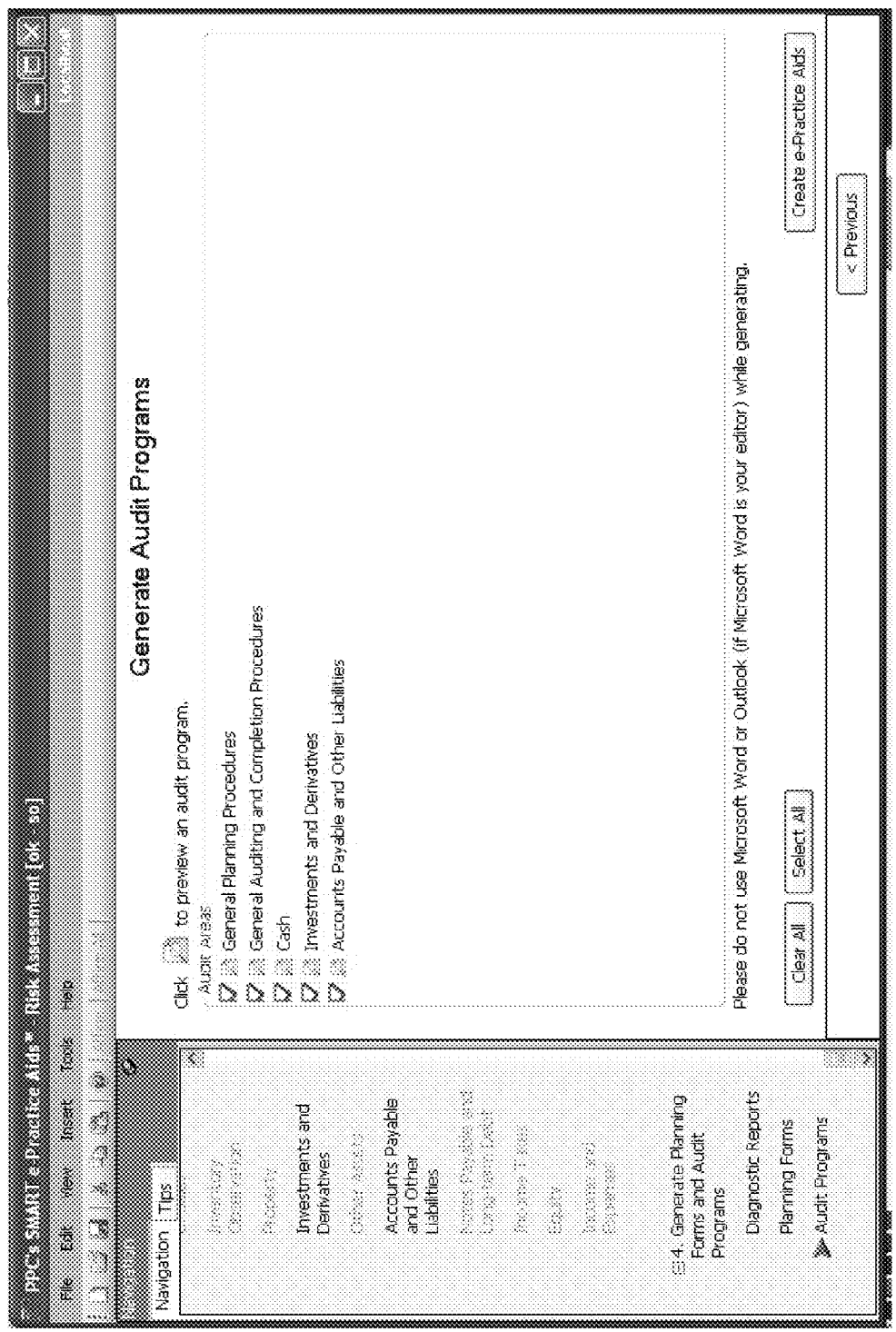
FIG. 21 depicts an exemplary Generate Audit Programs screen in keeping with the present invention.

From FIG. 18, pressing the Create e-Practice Aids button will prompt a user to input a location to save the audit report forms. An auditor may choose which report forms to create by selecting or deselecting the check box next to the form. A separate file will be created for each form generated by the software. FIG. 20 depicts a folder containing all forms generated by the program. FIG. 21 depicts the Generate Audit Programs screen. From here as in FIG. 18, an auditor may preview the audit programs and create the programs by selecting the Create e-Practice Aids button.

FIGS. 22 through 44 and the following text provide a more detailed description of the process of performing and documenting the audit work associated with an audit (e.g., the field work portion of the audit). FIG. 22 illustrates a General Planning Procedure audit program and related screen having a left pane, a center pane and a right pane for displaying information.

The center pane of the screen lists the particular procedures that have been defined for the entire engagement. As shown in FIG. 22, some of the particular procedures have a '+' icon associated therewith that once selected by the auditor, display subtasks associated with the particular procedure. In addition, as shown in FIG. 22, under the 'Objectives' label, identifiers are provided that represent financial statement assertions that relate to particular assertions. The assertions operate as a bridge between identified risks and audit procedures. For example, if an auditor identifies a risk as described previously, the system identifies which financial statement assertions are related to the risk and displays the same to the user. Example assertions include 'Completeness', 'Valuation or allocation', 'Accuracy or classification', 'Presentation', 'Existence' and 'Occurrence'.

The right pane of the screen provides a listing of available audit procedures that apply to the industry in which the entity is being audited. In one embodiment, audit procedures shown in the center pane are grayed out in the right pane and are unavailable for auditor selection due to prior selection. Audit procedures listed in the right pane and not included in the center pane are presented in bold for selection by the auditor.

The left pane of the screen displays audit areas that correspond to line items on one or more financial statements. Each of the audit areas shown in the left pane is associated with its own audit program.

The General Planning Procedure audit program shown in FIG. 22 may be generated during the planning phase of the engagement and includes a list of steps or tasks that are applicable to the entire engagement regardless of audit area. As shown in FIG. 22, the audit program is initially displayed in a 'design mode' which allows the auditor to modify the plan, either by adding and/or subtracting pre-defined audit procedures, revising text, and/or adding customized audit procedures. Advantageously, this functionality provides the auditor with an ability to further customize the audit engagement prior to actually commencing the field work portion of the audit.

In one embodiment, the screen displaying the audit program includes a design icon that once selected by the auditor, transitions the audit program from design mode to a 'completion mode' that allows the auditor to fill out one or more generated forms (e.g., work papers).

FIG. 23 illustrates the General Planning Procedure audit program in 'completion mode.' In completion mode, the auditor conducts the actual steps of the audit. In one embodiment upon completing an audit procedure, the auditor is provided functionality to date and electronically sign the procedure to indicate that it is completed. For example, as shown in FIG. 23, in one embodiment, a column entitled 'Performed by and Date' is provided that allows the auditor to electronically initial and date when an audit procedure is completed. Unsigned audit program procedures are highlighted and are identifiable using diagnostic functionality as described below. In addition, as shown in FIG. 23, an icon is also provided adjacent each audit procedure that once selected by the auditor, allows the auditor to enter and save comments regarding the audit program procedure and/or one or more associated work papers.

Figure 24:
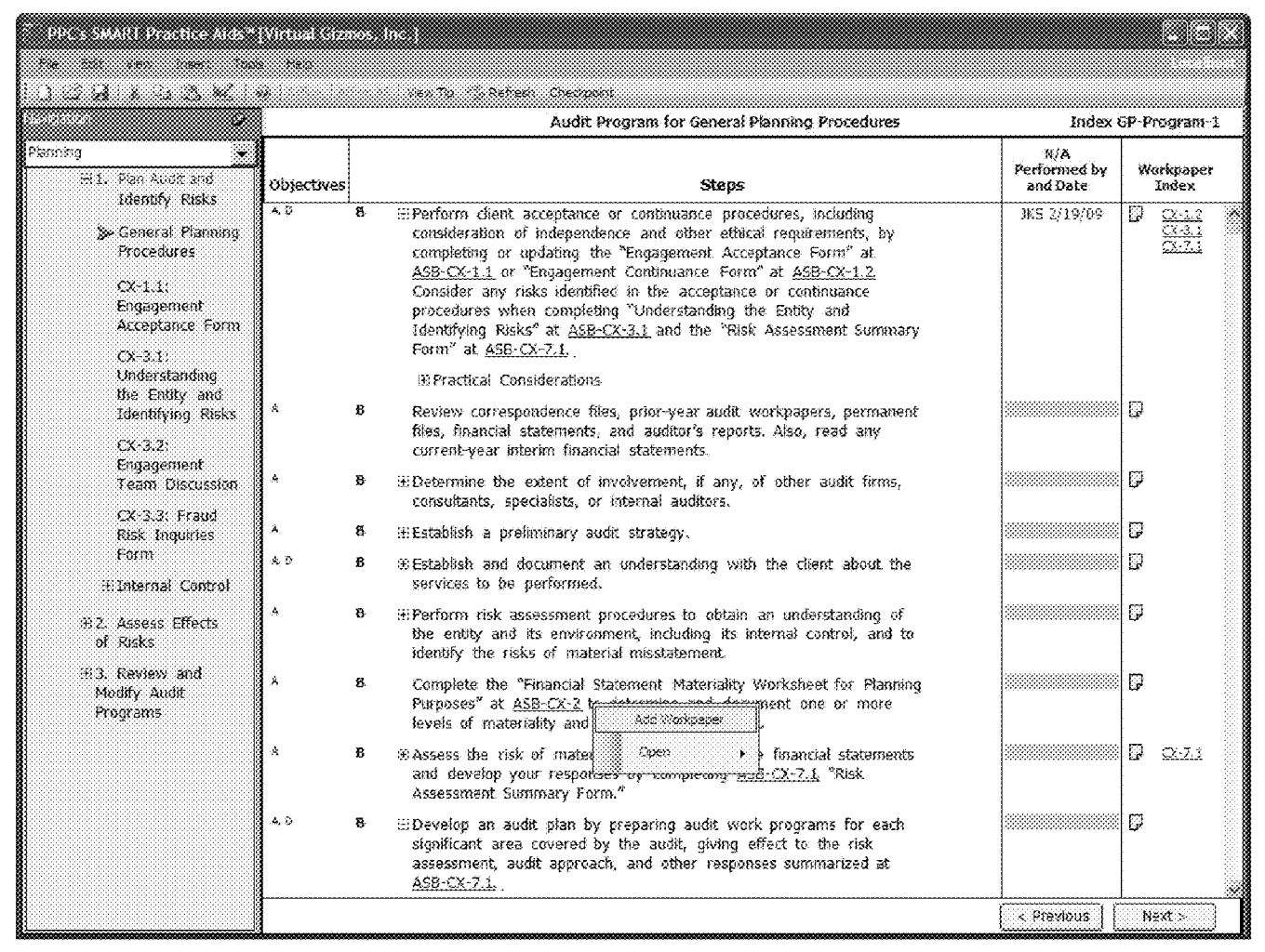

Turning now to FIG. 24, a screen illustrating work papers associated with procedures of the General Planning Procedure audit program is disclosed. As shown in the FIG. 24 example, in one embodiment, the screen provides functionality to associate (e.g., link) work papers with specific audit program procedures. In one embodiment, each of the work papers are accessible via a hyperlink that once selected, causes the system to display the work paper and information contained therein on the screen. In one embodiment, as shown in FIG. 24, a pop-up menu is also provided that once selected, allows the auditor to access and associate one or more work papers, such as a PPC practice aid, with an audit program procedure.

FIG. 25 illustrates a screen for manual navigation of audit areas. As shown in the left pane of FIG. 25, the auditor may select from a drop-down menu any one of a plurality of audit areas included in the engagement. For example, as shown in the FIG. 24 example, the audit areas may include planning, cash, accounts receivable, inventory, property, investments, other asserts, accounts payable, notes payable, income taxes, equity, income and expenses, and general auditing. Upon selection of any one of the audit areas, an audit program associated with the selected audit area is shown by the system in the center pane.

FIG. 26 illustrates a screen for displaying an Accounts Receivable and Sales audit program. The left pane of the screen displays a listing of audit programs and risk assessments summaries created during the planning phase of the audit. Advantageously, the present invention allows an auditor, as part of the field work portion of the audit, to manage, organize, and track all work papers relating to an engagement. For example, in one embodiment, as shown in FIG. 26, all of the work papers included in an engagement relating to the Accounts Receivable and Sales audit program are shown in the left pane. The center pane, as described previously, displays audit program procedures relating to the account receivable audit area, and the right hand pane shows hyperlinks to work papers that have been associated with specific procedures of the audit program. As such, the system allows an auditor to manage and organize every work paper included in the engagement.

Figure 27:
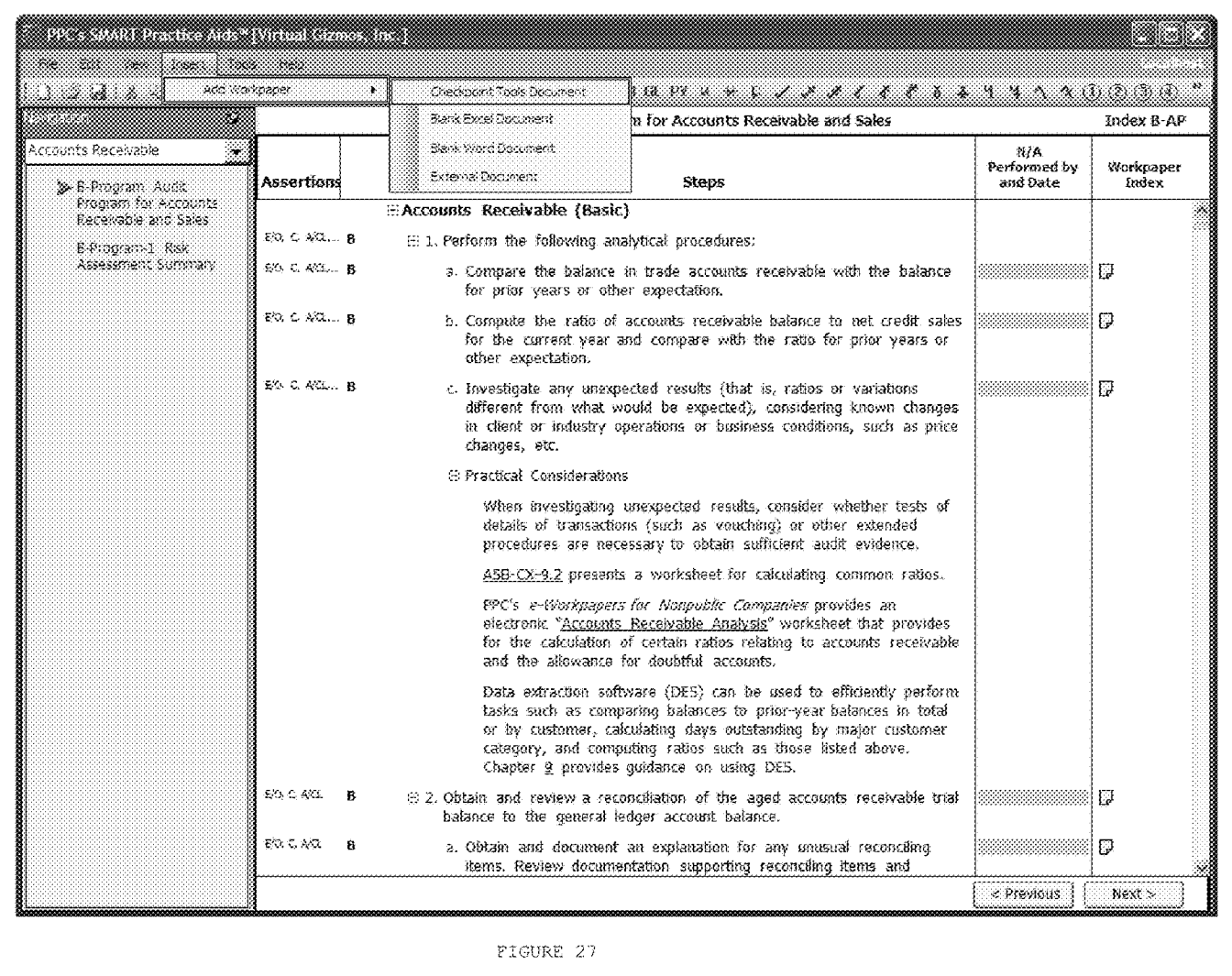

FIG. 27 illustrates a pop-up menu for adding external work papers (e.g., documents) to the engagement. As shown in FIG. 27, external documents may be added from a variety of sources. For example, in one embodiment, the system provides functionality to add Microsoft Excel® documents, Microsoft Word® documents, as well as other types of external documents including, but not limited to, text files to the engagement.

FIG. 28 illustrates a screen showing example Microsoft Excel® documents previously added to the engagement. In one embodiment, selection of an external document from the left pane causes the system to open and display the selected document in the audit tool using the native application that created the document. As such, the auditor can easily view and modify the external document without leaving the audit tool application. For example, referring now to FIG. 29, upon the user selecting the work paper entitled 'B-1 Accounts Receivable Analysis.xls', the system opens the B-1 Accounts Receivable Analysis.xls spreadsheet in the audit tool application using Microsoft Excel® and displays the same to the auditor. Advantageously, independent external work documents can be integrated and displayed using the disclosed audit tool application.

Figure 30:
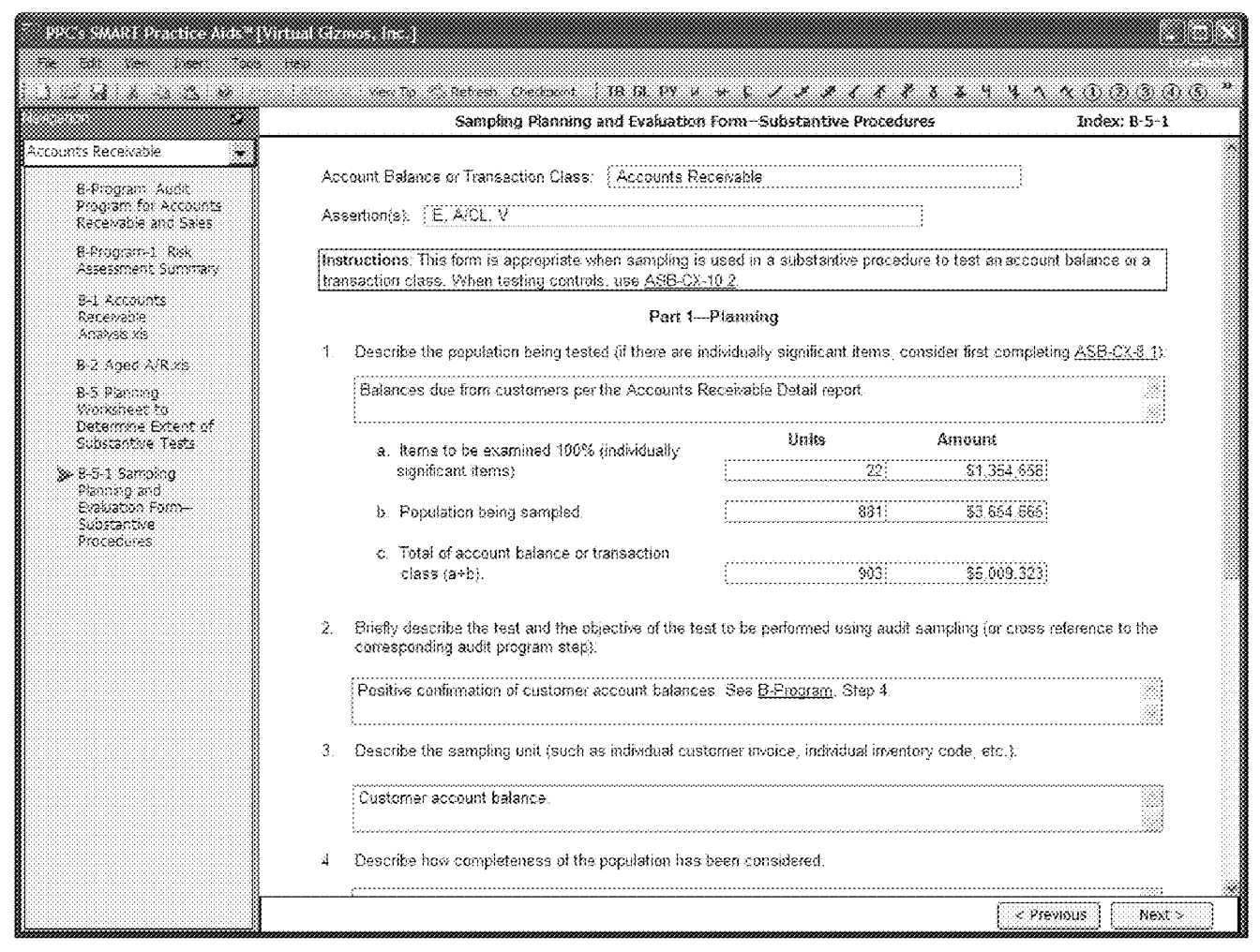
Figure 31:
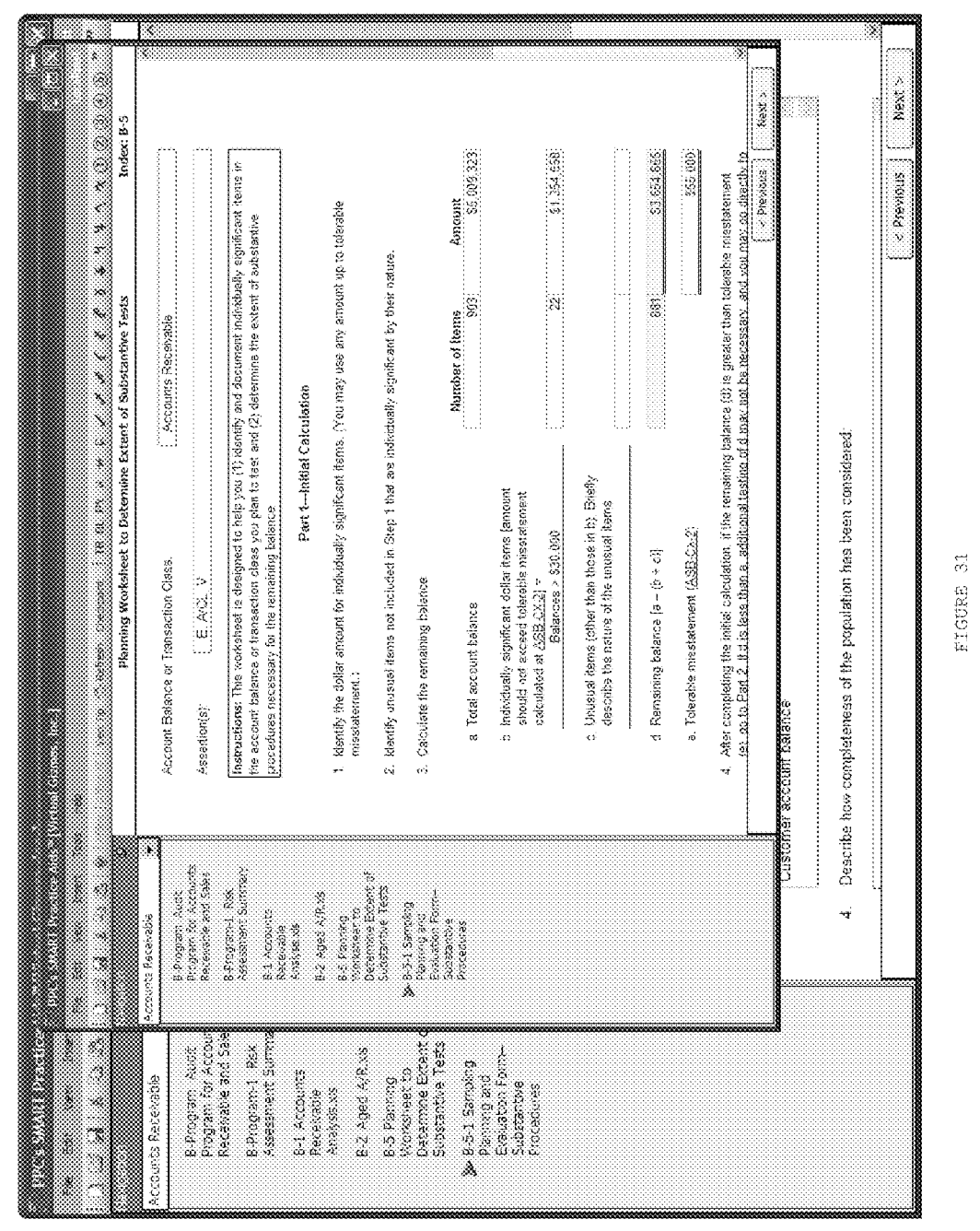
Figure 32:
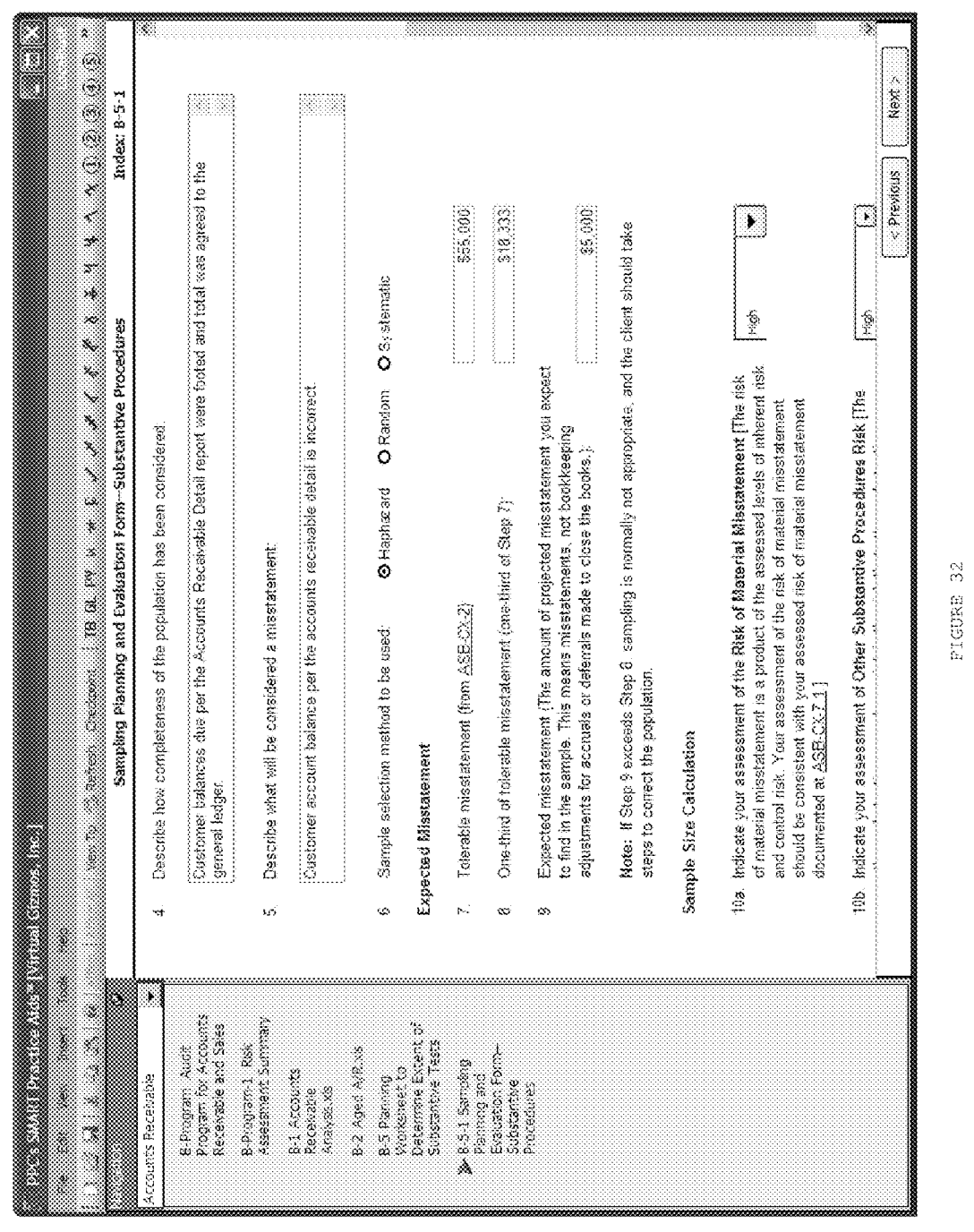

FIGS. 30-32 illustrate the sharing of information among multiple work papers. Since aspects of the present invention manage the entire audit engagement, information determined in one working paper document can be shared by the system among multiple work paper documents, where relevant and needed for further decision making. For example, the 'Tolerable misstatement' value computed at location '3e' of the materiality work sheet entitled 'Planning Worksheet to Determine Extent of Substantive Tests' shown in FIG. 31, is made available by the system at line 7 of the work paper entitled 'Sampling Planning and Evaluation Form—Substantive Procedures' shown in FIG. 32. As such, aspects of the present invention allow information to be shared among various work papers in the engagement. In one embodiment, data value calculations and table lookups of information are performed automatically in work papers.

Figure 33:
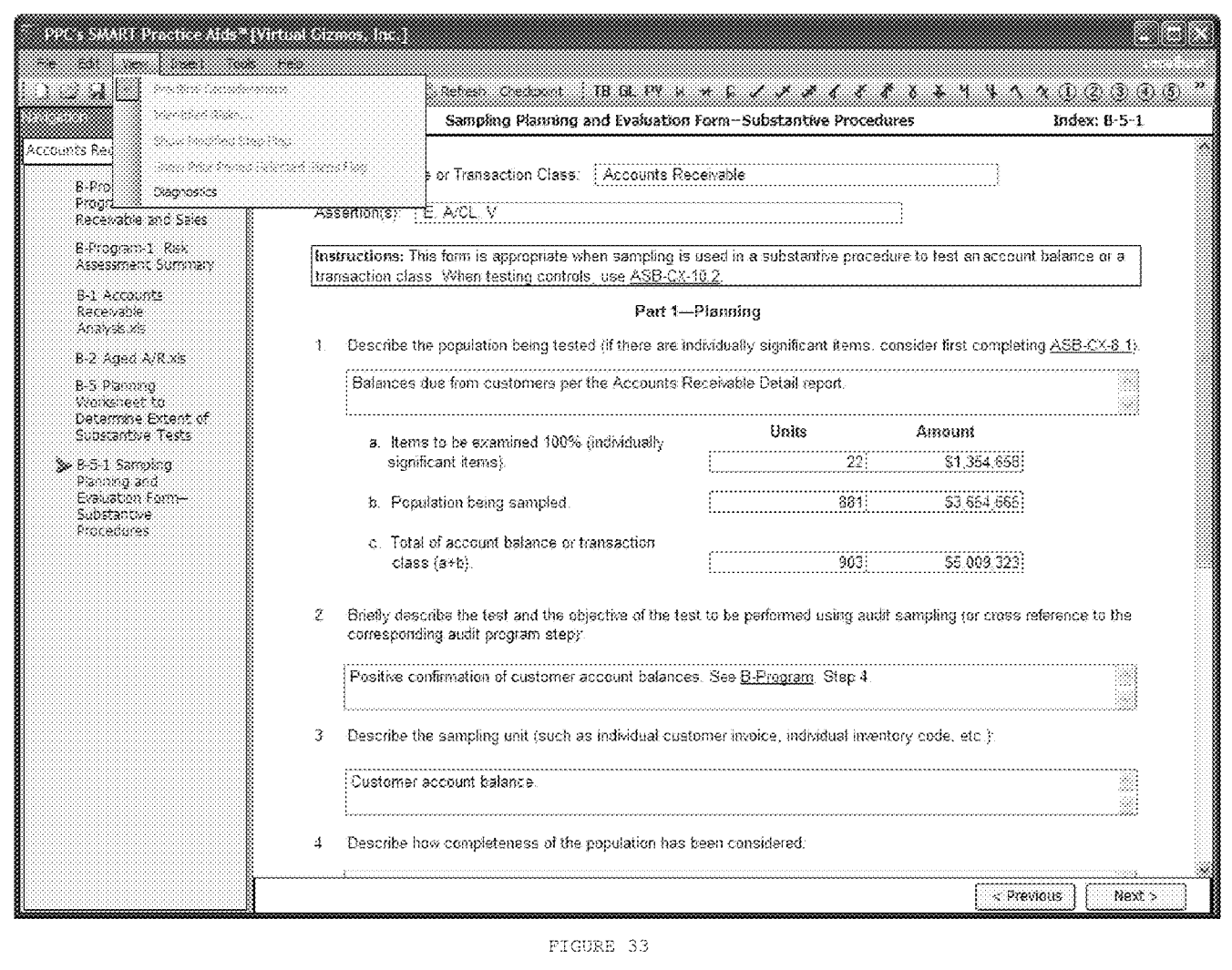

FIG. 33 illustrates a screen having a diagnostics menu option that, upon selection by the auditor, causes the system to evaluate the completeness of the field work portion of the engagement. As such, diagnostic functionality of the present invention is not limited to the analysis of information determined during the planning phase of the audit, which is discussed in connection with FIG. 17. For example, in one embodiment, upon the auditor selecting the diagnostics menu option, the system identifies unfinished work papers, unsigned audit program steps, and work papers not signed off as completed or as reviewed. In another embodiment, diagnostics functionality of the system also provides notifications to auditors when comments are associated with an audit procedure and/or work paper.

Figure 34:
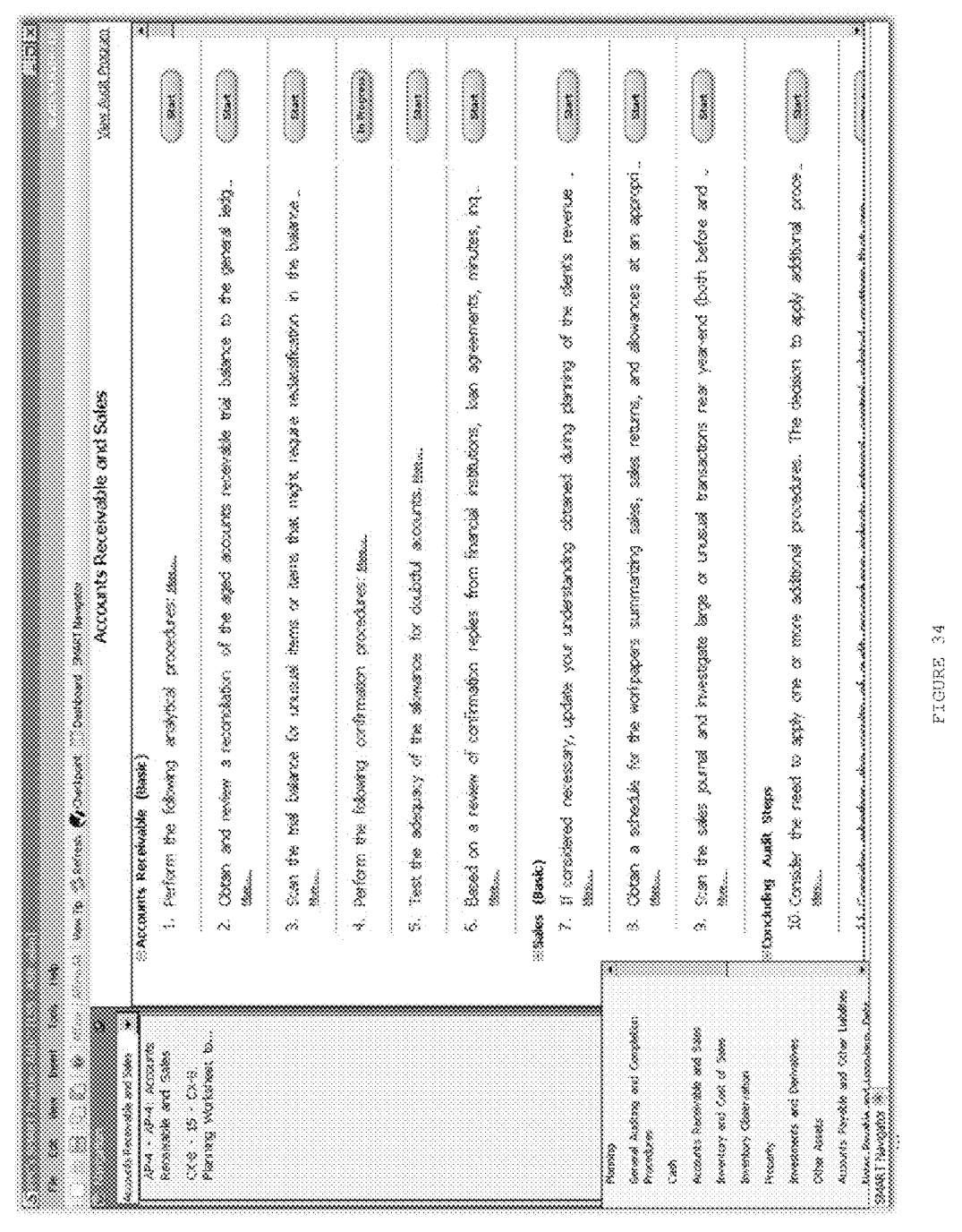
Figure 35:
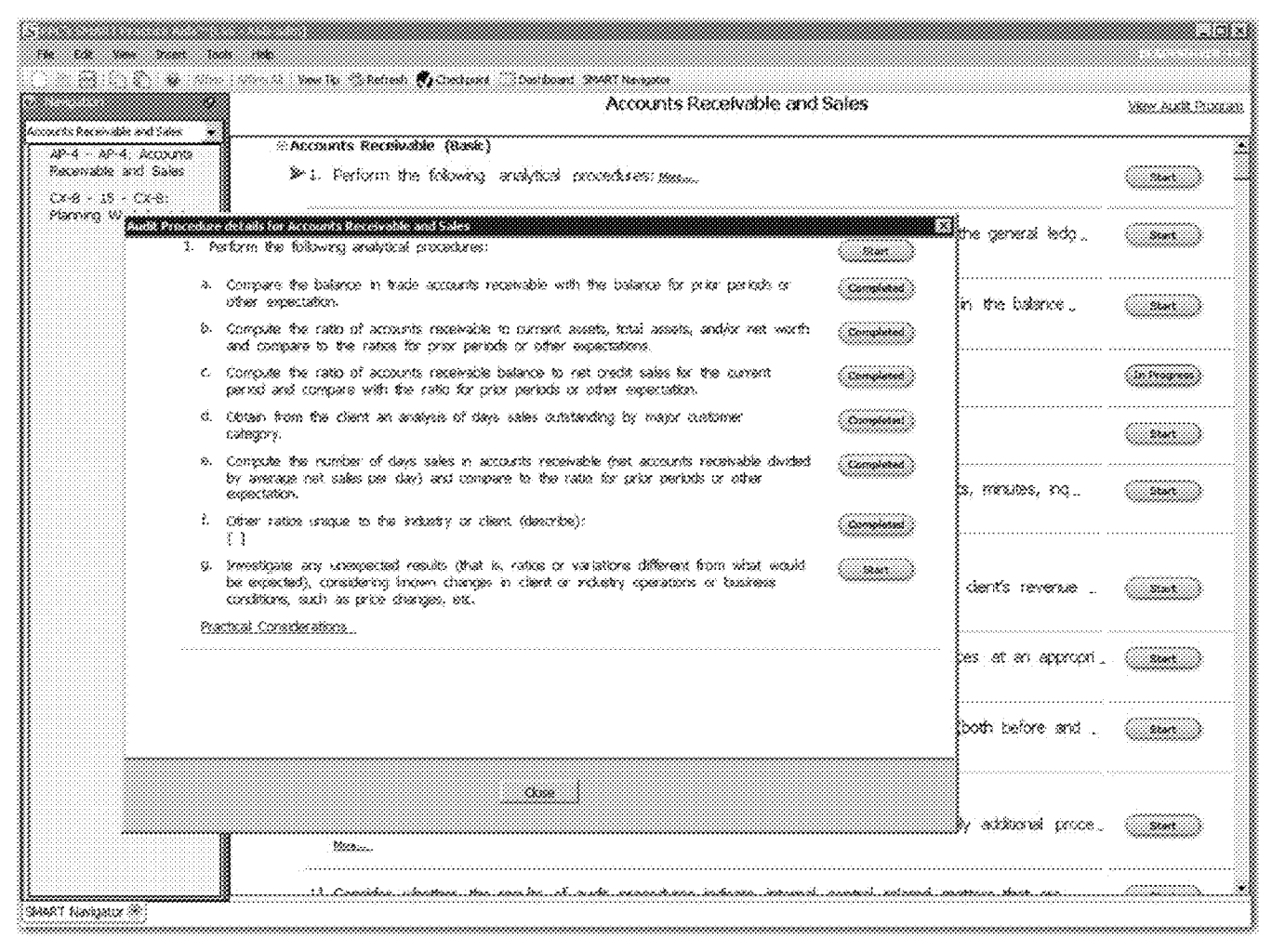

FIGS. 34-35 depict means for providing additional navigation functionality included in the present invention. In addition to the manual navigation discussed in connection with FIG. 25, in one embodiment, the system is also configured to guide the auditor through the field work portion of the audit from beginning to end. The system is also configured to provide a visual status of each audit procedure included in an audit plan.

For example, in one embodiment, a selectable navigation menu option is provided that allows the auditor to select one of a plurality of audit areas. Once an audit area is selected, the system provides an audit program that includes a summary of the procedures to be performed in the audit program, a status of each of the audit program procedures, and a hyperlink that once selected, displays a status of each subtask included in that audit program procedure.

An example is shown in connection with FIG. 34. In the FIG. 34 example, upon selection of the Accounts Receivable and Sales option of the SMART Navigator menu option, an Accounts Receivable and Sales audit plan is displayed to the auditor that includes summarized procedures of the audit plan with associated hyperlinks. A selectable status indicator is also provided for each procedure that indicates whether the audit procedure is started, in progress, or is complete. In one embodiment, the selectable status indicators are color coded to provide the auditor with a visual clue of the status of each procedure. Upon selection of a selectable status indicator, the system toggles the status of the audit procedure between one of a plurality of status states. In one embodiment, example status states include 'Start', 'In Progress', and 'Completed'.

FIG. 35 is a screen illustrating subtasks associated with a selected audit procedure that are presented to the auditor upon selection of one of the hyperlinks discussed in connection with FIG. 34. In one embodiment, subtasks associated with a selected audit procedure include selectable status indicators indicating a status state of each subtask. In one embodiment, the selectable status indicators are push buttons labeled with status identifier (e.g., state) information.

By way of example, as shown in the FIG. 35 example, subtasks '1a' through '1f' are associated with a status state of 'Completed' indicating that field work relating to that procedure is complete and subtask '1g' is associated with a status state of 'Start' indicating that field work relating to subtask '1g' is to be begin. Upon the auditor selecting the 'Start' status indicator associated with subtask '1g', the status state of the indicator associated with subtask '1g' changes to 'In Progress' and the auditor may begin work to complete that task.

Upon subsequent invocation of the SMART navigator menu option by the auditor, the system automatically guides the auditor to the audit procedure last completed if no audit procedures are currently in progress. If at least one audit procedure or subtask of the audit plan is associated with a status state of 'In Progress', the system navigates the auditor to that audit procedure to continue the field work portion of the audit. As such, by using the above described functionality, the system is able to navigate the auditor through the entire field work portion of the engagement.

Additional audit program design functionality is also provided by the present invention. In one embodiment, the system allows the auditor to view planned audit program steps by selected assertions. The system is configured to filter and display only those assigned risk values and audit program steps that relate to those assertions.

Figure 36:
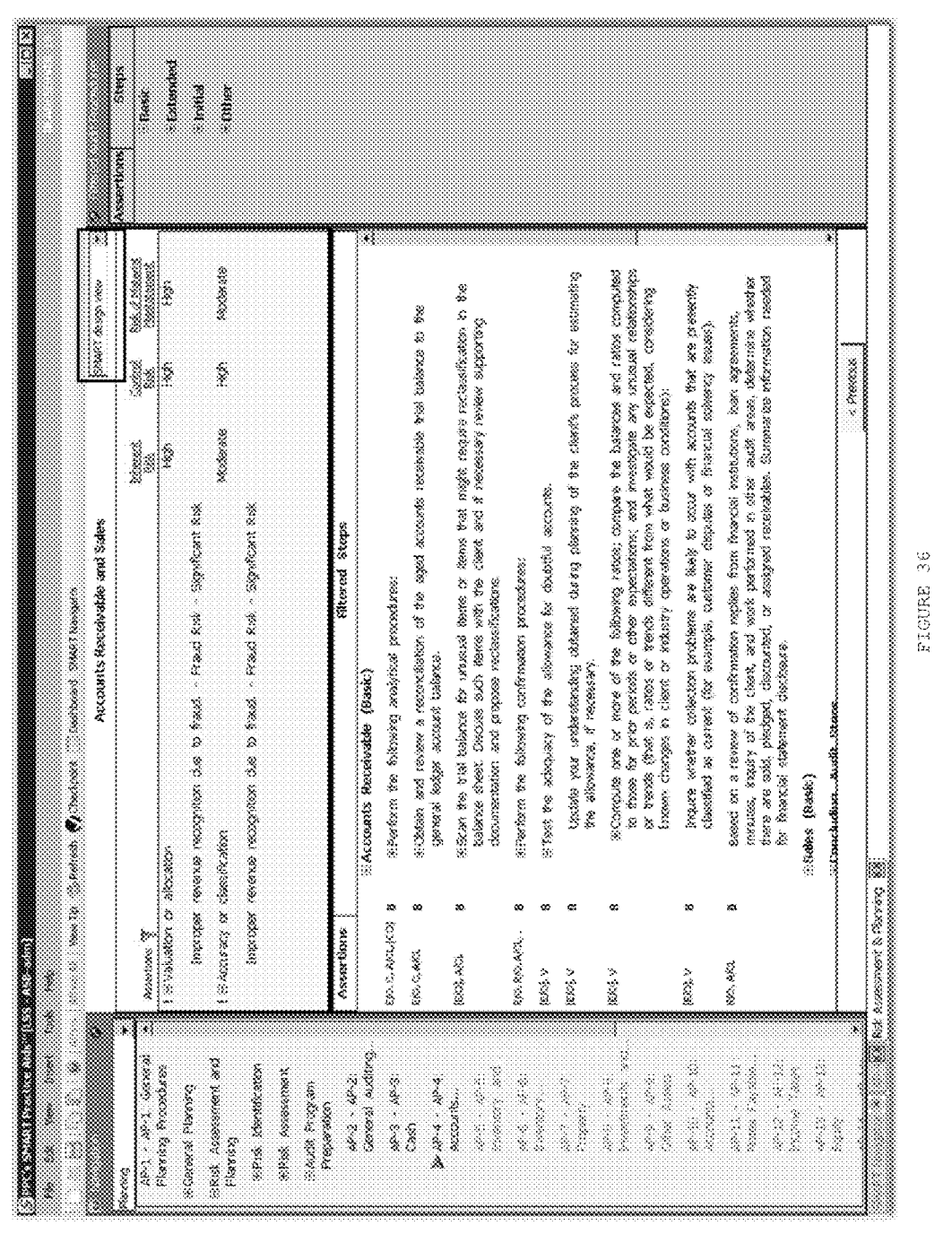

An example is shown in connection with FIG. 36. In that example, example assertions (e.g., 'Valuation or allocation' and 'Accuracy or classification') are associated with an Accounts Receivable and Sales audit program. As shown in the FIG. 36 example, the auditor identified 'Improper Revenue Allocation' as a risk and assessed such risk as being 'High'. The system allows the auditor to view only those relevant audit procedures that relate to the identified risk to ensure that the risk is being analyzed properly.

An example of filtered audit procedures is shown in the lower center pane of FIG. 36. An alphabetic 'V' is shown in the 'Assertions' column of the lower center pane indicating that some of the procedures displayed are associated with the 'Valuation or allocation' assertion. An alphabetic 'A/CL' is also shown in the Assertions column indicating that other audit procedures displayed therein are associated with the 'Accuracy or Classification' assertion. Accordingly, each audit program procedure of the present invention can be associated with one or more assertions and be displayed to the auditor upon request. In particular, the system is configured to filter and display only those audit program procedures that relate to selected assertions upon request. Advantageously, by providing such functionality, the system allows the auditor to ensure that particular assertions are addressed in a manner desired by the auditor.

Figure 37:
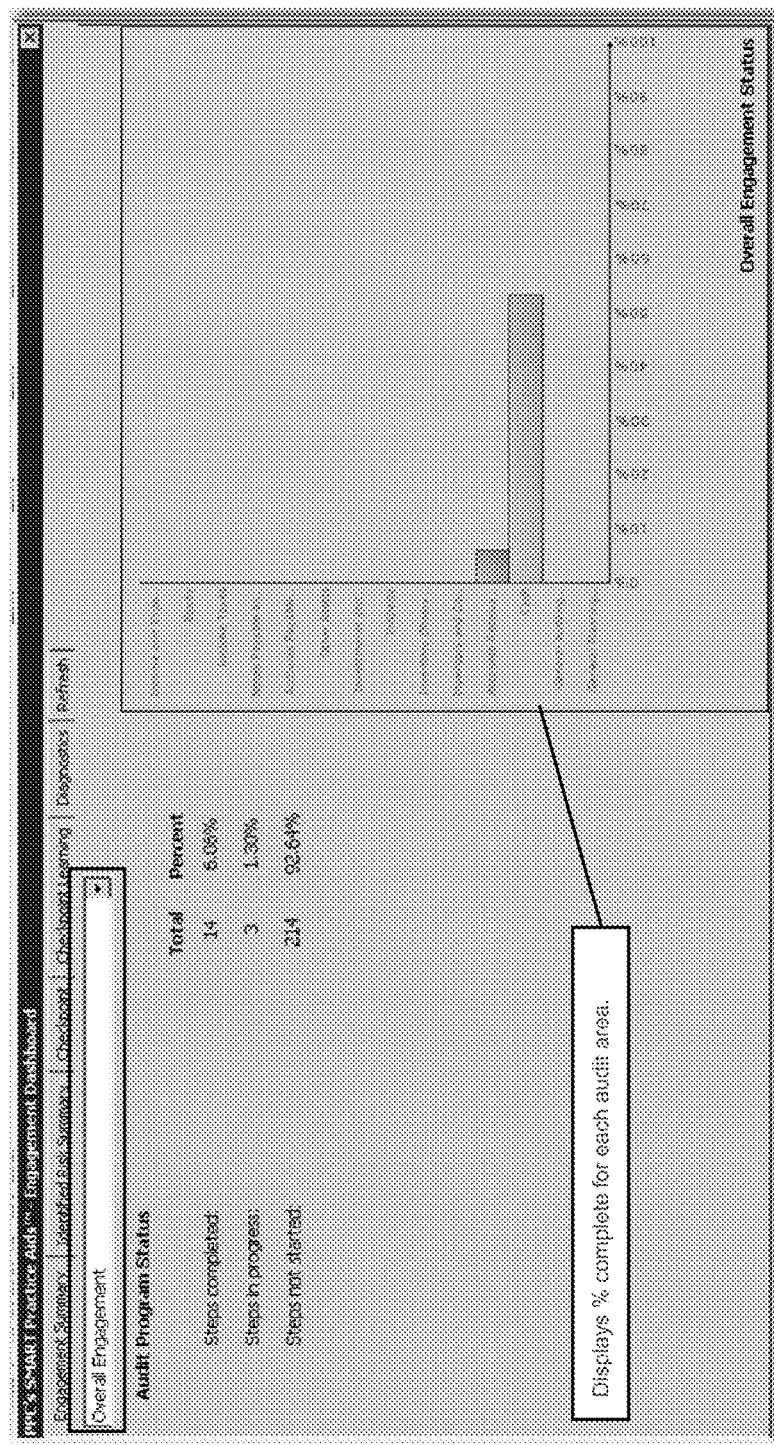
FIGS. 37-38 depict a screen showing dashboard functionality and audit statistics.
Figure 38:
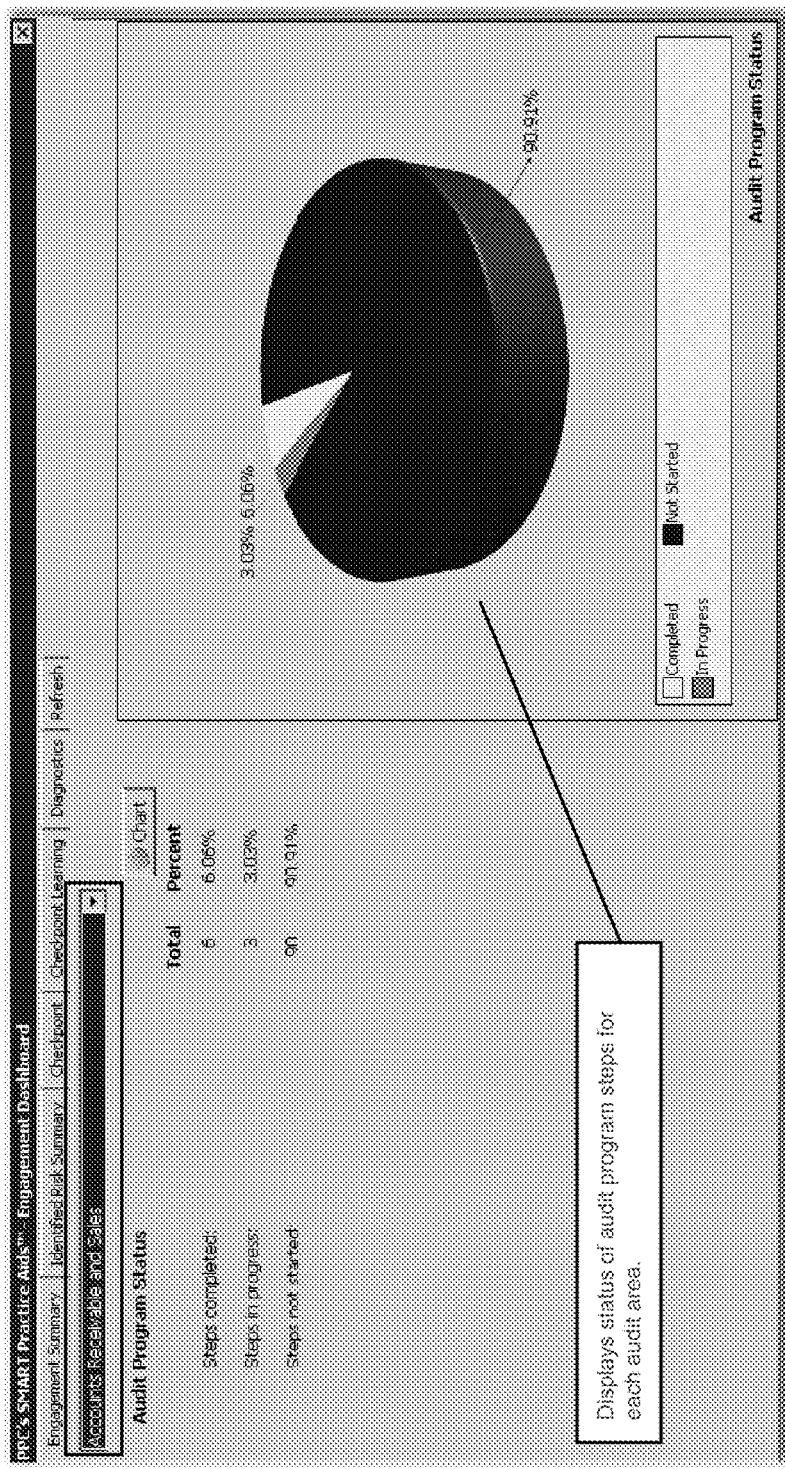

FIGS. 37-38 illustrate dashboard functionality provided by the system. In one embodiment, the dashboard functionality provides operational statistics regarding audit program progress included in an engagement, as well as overall engagement progress. For example, as shown in the FIG. 37 example, operational statistics computed for the overall engagement can include the total and percentage of audit procedures completed, in progress, and not yet started. The computed statistical information can be presented to the auditor in a tabular row column format, as well as graphically using bar charts, pie charts, and the like. FIG. 38 illustrates example statistics generated for an Accounts Receivable and Sales audit plan. Of course, it will be appreciated by one skilled in the art that dashboard functionality of the present invention is not limited to computing operational statistics and can include providing additional decision support tools and information to the auditor.

Several aspects of the invention relate to generating documents, such as work papers, and then storing those generated documents in an external engagement management system. In one embodiment, generated documents that are to be stored in an external engagement management system are represented as icons in the audit tool. Upon selection of the icon, the system accesses the external document from the external engagement management system and displays the content of the external document for viewing or modifying in the audit tool. The system associates with the icon an address location of the external document, which is used by the system to access the external document. Additional details of generating and storing documents are disclosed in U.S. patent application Ser. No. 12/004,827 filed Dec. 21, 2007, now U.S. Patent Publication No. US 2009/0112741, entitled "Method and System of Generating Audit Procedure and Forms", the contents of which are incorporated herein in their entirety. As such, documents managed by external management systems can be integrated into the present system in a seamless fashion while remaining synchronized with related audit information included in the present system.

Figure 39:
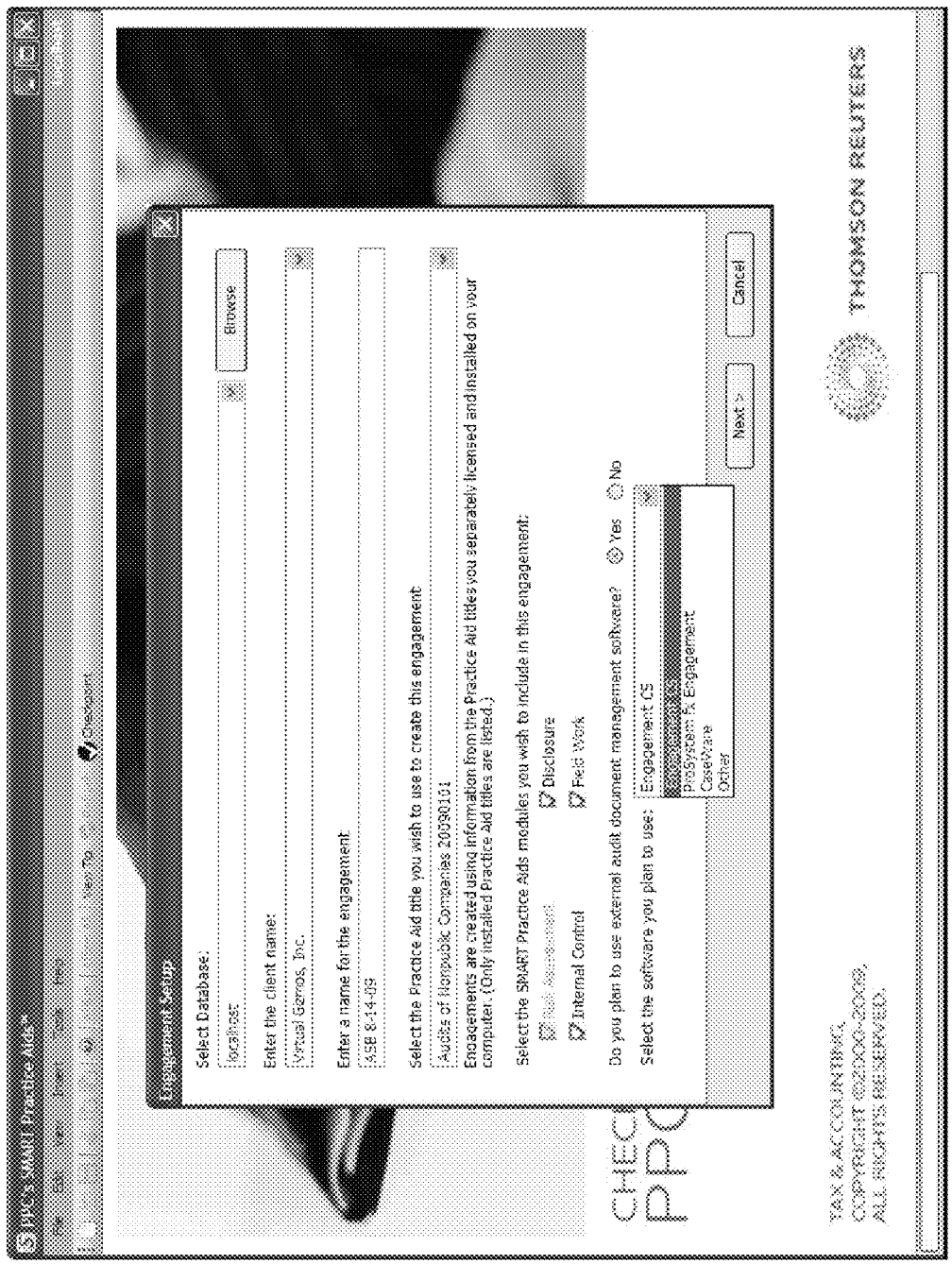
FIG. 39 depicts a screen for identifying the type of external engagement management system into which work papers are stored.

FIG. 39 illustrates a screen for querying whether the auditor plans to use external engagement management software for the audit. As shown in the FIG. 39 example, in one embodiment, the auditor is presented with a query as to whether external document management software is to be used during engagement setup. If the auditor indicates 'No', the system stores all documents internal to the present system. If the auditor indicates 'Yes', a selectable pull-down list of external engagement management systems is provided to the auditor for selection. The system then interfaces with the respective engagement management system to access and store selected documents.

Figure 40:
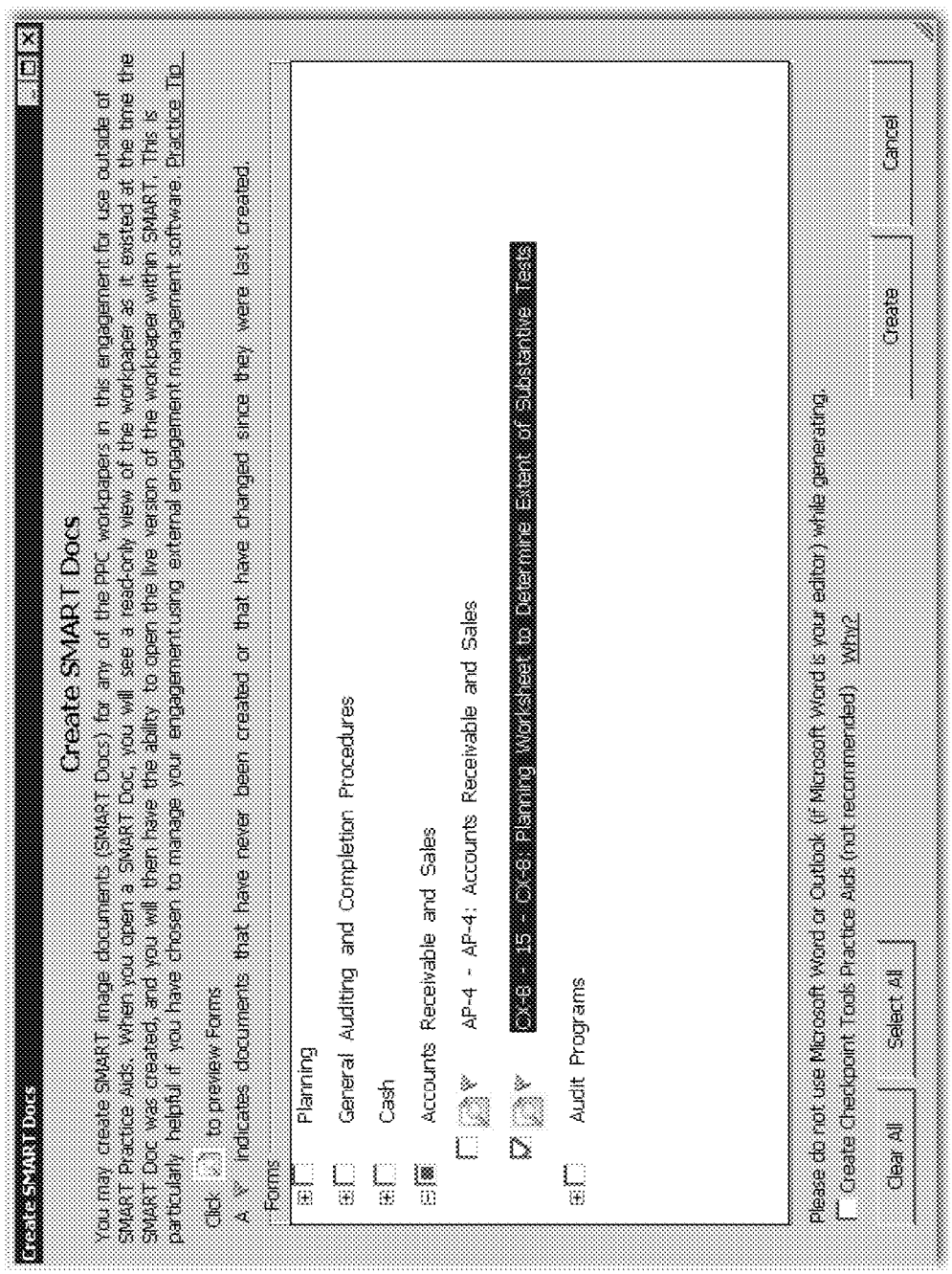
FIG. 40 depicts a screen for selecting documents to be placed into an external engagement management system.

FIG. 40 illustrates a screen for selecting documents for use with an external engagement management system. Once the auditor selects one or more documents and selects the 'Create' button, the selected documents, hereinafter referred to as SMART documents, are created and depending upon which engagement management system the auditor selected, the system stores the created documents in the selected engagement management system. In one embodiment, the system stores SMART documents in a predetermined location, such as a disk drive, for storage in the external engagement management system.

Figure 41:
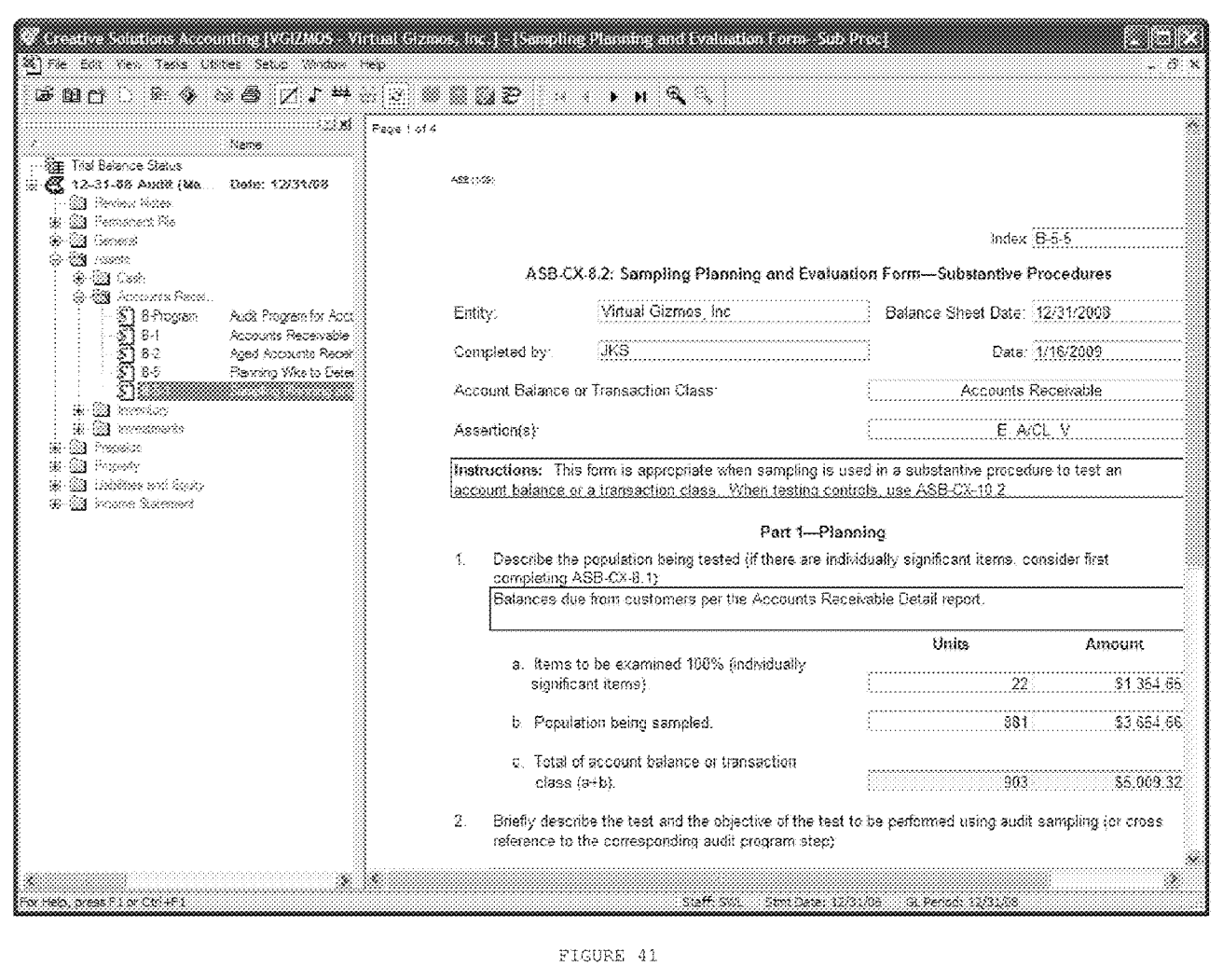
Figure 42:
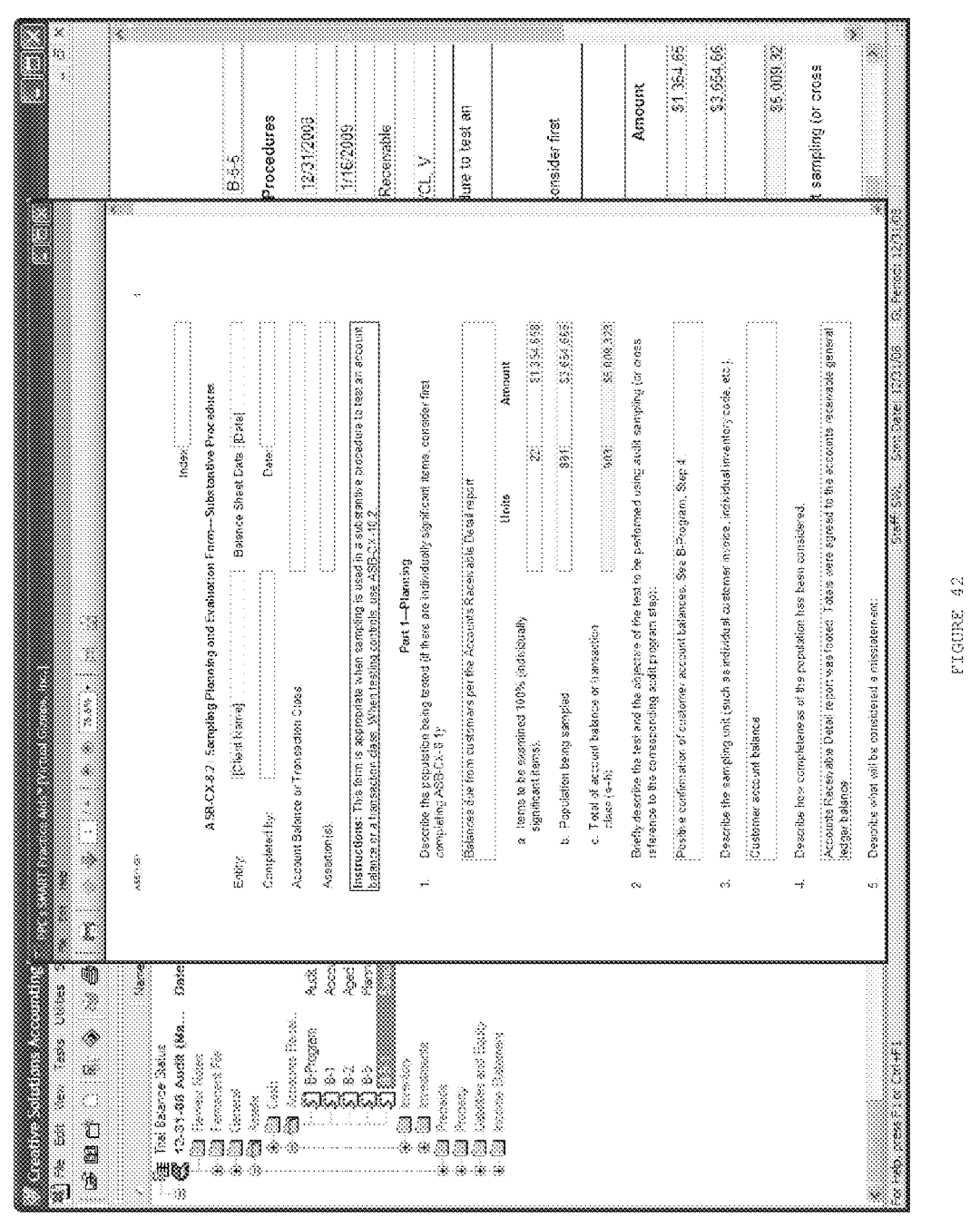

FIG. 41 illustrates a screen showing a plurality of SMART documents stored in an external engagement management system. In one embodiment, as shown in FIG. 41, SMART documents are represented as icons in the system. The auditor can interact with SMART documents as they would with any other work paper included in the system. For example, the auditor can review, sign-off, and manage SMART documents using the before-mentioned engagement management features. FIG. 42 illustrates a view of example data content included in a SMART document in read-only mode. The data content may be viewed as well as printed.

Figure 43:
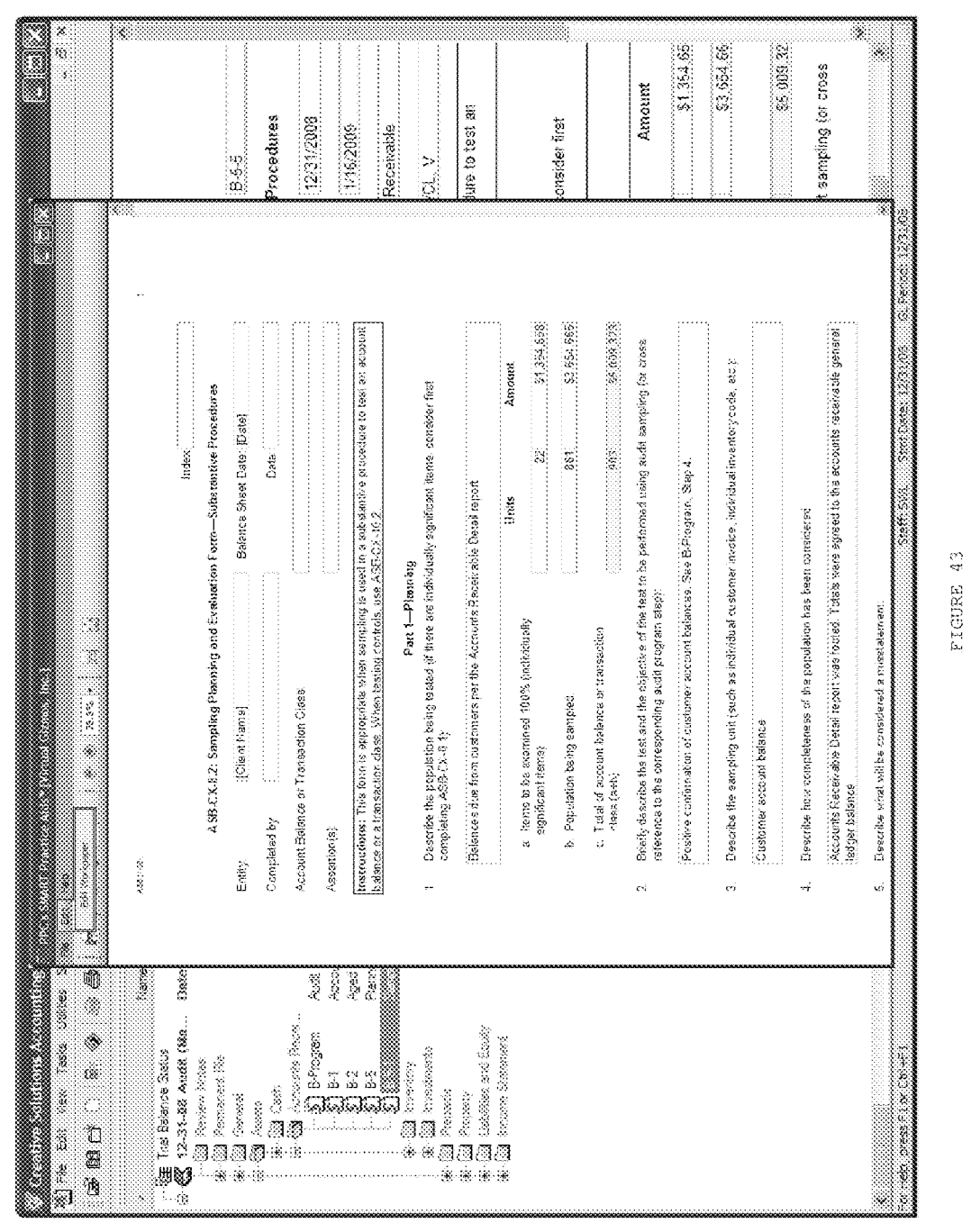
Figure 44:
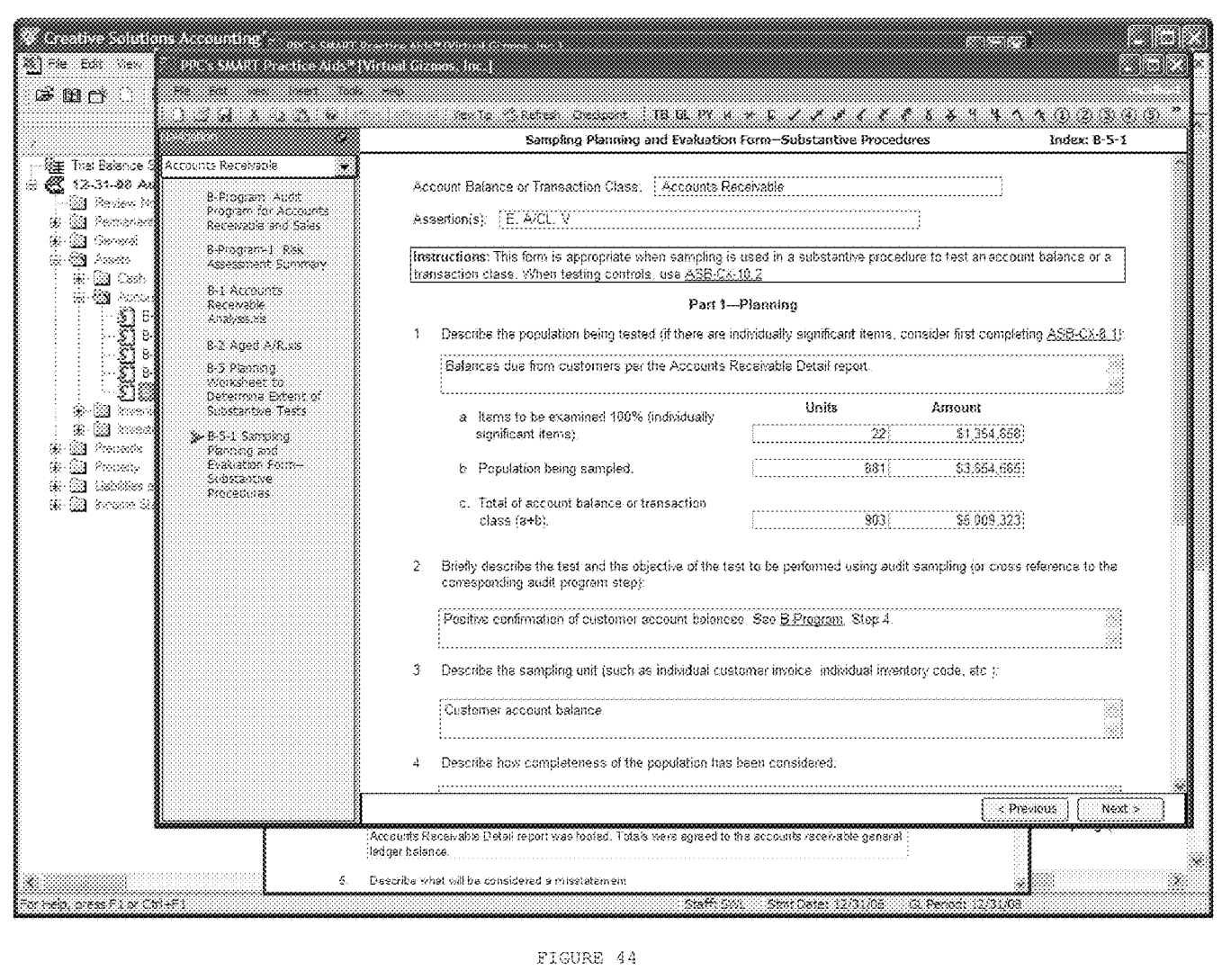

In one embodiment, referring now to FIG. 43, a screen is shown that includes an 'Edit Workpaper' menu option that once selected, allows content of the SMART document to be modified. For example, referring now to FIG. 44, upon selection of the Edit Workpaper menu option, the system accesses the external document represented by the SMART document and opens the SMART document inside the application of the present invention for editing. Upon saving the edited SMART document, the system automatically updates SMART document icons to reflect any modifications and stores the modified SMART document back to the external engagement management system. As a result, external work papers stored in external engagement management systems are synchronized with audit information stored in the system of the present invention.

The present invention also provides financial analysis functionality to an auditor. In one embodiment, the system automatically analyzes financial information, such as general ledger information, trial balance information, and financial statement information, that is stored in external financial systems.

For example, the system can determine what financial statement areas exist in financial information and which financial statement areas represent significantly large dollar amounts. In one embodiment, the system represents the financial information using eXtensible Business Reporting Language (XBRL). The system then automatically selects and deselects and tailors audit plans for use in the audit based on the audit areas and attributes thereof represented by the financial information.

The present invention is not to be limited in scope by the specific embodiments described herein, It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A computer-implemented method for planning and performing an audit, the method comprising:
   presenting by a display, a plurality of inquiries to a user comprising a plurality of audit items and a set of risk levels associated with the plurality of audit items, the plurality of audit items comprising in part, a set of assertions associated with a set of assertion categories, the set of assertion categories comprising assertions pertaining to classes of transactions and events for the period under audit, assertions pertaining to account balances at the period end and assertions pertaining to presentation and disclosure, the set of risk levels further being associated with a plurality of audit risks comprising inherent risk, control risk and assessed risk of material misstatement;
   processing a set of responses to the presenting step, the processing including executing a response code set by a computer, said processing comprising associating a selected risk level from the set of risk levels to a given response from the set of responses input;
   generating automatically at least one customizable audit plan and one or more alternative audit plans for conducting the audit based at least in part on the processing step, the audit plan comprising a plurality of audit procedures associated with an audit area, the generating including executing an audit code set by the computer;
   presenting to the user, by the display, the at least one customizable audit plan and one or more alternative audit plans;
   presenting one or more electronic documents associated the at least one customizable audit plan and one or more alternative audit plans, said one or more electronic documents maintained on one or more external engagement management systems, a given electronic document comprising a smart document.

2. The method of claim 1 wherein navigating through the plurality of audit procedures comprises guiding a user through the audit procedures.

3. The method of claim 1 further comprising generating a textual summary of each of the plurality of audit procedures.

4. The method of claim 3 comprising associating a selectable status identifier with each of the plurality of audit procedures.

5. The method of claim 4 wherein each of the selectable status identifiers is color-coded to provide a visual indicator of a status of each audit procedure.

6. The method of claim 4 wherein the selectable status identifier includes a label value selected from the group consisting of 'Start', 'In Progress', and 'Completed'.

7. The method of claim 3 further comprising:
   associating a hyperlink with each of the textual summaries; and
   providing at least one subtask associated with the audit procedure in response to selection of the hyperlink.

8. The method of claim 1 wherein navigating through the plurality of audit procedures comprises guiding a user to a last completed audit procedure if no audit procedures included in the audit are currently in process.

9. The method of claim 1 wherein navigating through the plurality of audit procedures comprises guiding a user to a most recent in-process audit procedure.

10. The method of claim 1, further comprising the steps of:
generating a work paper relating to the audit area in a first engagement management system;
in response to a request, associating an identifier with the work paper in the first engagement system and providing the work paper for storage in a second engagement management system, wherein the work paper is retrievable from the second management system into the first management system using the identifier.

11. A system for planning and performing an audit, the system comprising:
a computer having an associated memory, a display, and an input device and adapted to execute code;
a graphical user interface adapted to operate on the computer and adapted to present a plurality of inquiries to a user comprising a plurality of audit items and a set of risk levels associated with the plurality of audit items, the plurality of audit items comprising in part, a set of assertions associated with a set of assertion categories, the set of assertion categories comprising assertions pertaining to classes of transactions and events for the period under audit, assertions pertaining to account balances at the period end and assertions pertaining to presentation and disclosure, the set of risk levels further being associated with a plurality of audit risks comprising inherent risk, control risk and assessed risk of material misstatement, the graphical user interface adapted to receive a set of responses from the input device;
a response code set adapted to be executed on the computer and adapted to process the set of responses, associate a selected risk level from the set of risk levels to a given response from the set of responses input; and
an audit code set adapted to be executed by the computer and adapted to:
automatically generate at least one customizable audit plan and one or more alternative audit plans based at least in part on a processed set of responses, the audit plan comprising a plurality of audit procedures associated with an audit area;
present to the user, by the display, the at least one customizable audit plan and one or more alternative audit plans; and
present one or more electronic documents associated the at least one customizable audit plan and one or more alternative audit plans, said one or more electronic documents maintained on one or more external engagement management systems, a given electronic document comprising a smart document.

12. The system of claim 11 wherein the audit code set is adapted to guide a user through the audit plan.

13. The system of claim 11 wherein the audit code set is further adapted to generate a textual summary of each of the plurality of audit procedures.

14. The system of claim 13 wherein the audit code set is further adapted to:
associate a hyperlink with each of the textual summaries; and
provide at least one subtask associated with the audit procedure in response to selection of the hyperlink.

15. The system of claim 11 wherein the audit code set is further adapted to associate a selectable status identifier with each of the plurality of audit procedures.

16. The system of claim 15 wherein each of the selectable status identifiers is color-coded to provide a visual indicator of at least one audit procedure status from the plurality of audit procedures.

17. The system of claim 15 wherein the selectable status identifier includes a label value selected from the group consisting of 'Start', 'In Progress', and 'Completed'.

18. The system of claim 11 wherein the audit code set is further adapted to guide a user to a last completed audit procedure if no audit procedures included in the audit are currently in process.

19. The system of claim 11 wherein the audit code set is further adapted to guide a user to a most recent in process audit procedure.

20. The system of claim 11 wherein the audit code set is further adapted to associate at least one assertion with each of the plurality of audit procedures and filter the plurality of audit procedures by the at least one assertion, and the graphical user interface is adapted to present the filtered audit procedures in response to a request.

21. The system of claim 20 wherein the graphical user interface presents risk values relating to the at least one assertion.

22. The system of claim 11 wherein the audit code set is further configured to:
compute an operational statistic related to the audit plan based on an audit dashboard; and
provide the computed operational statistic in response to a request.

23. The system of claim 22 wherein the graphical user interface displays the operational statistic in a tabular row column format.

24. The system of claim 22, wherein the graphical user interface displays the operational statistic graphically.

25. The system of claim 22 wherein the audit dashboard comprises at least one of a number of audit procedures started, in progress, and completed.

26. The system of claim 11 wherein the work paper is provided in a read-only mode.

27. The system of claim 11 wherein the audit code set is further adapted to:
generate a work paper relating to an audit area in a first engagement management system;
store the work paper in a second engagement management system and an identifier to the work paper in the first engagement management system in response to a first request;
retrieve the work paper from the second engagement management system using the identifier in response to a second request; and
provide the retrieved work paper in the first engagement management system in response to the second request.

28. The system of claim 27 wherein the audit code set is further configured to:
modify the work paper in the first engagement management system;
automatically store the modified work paper in a location associated with the second engagement management system based on at least one attribute of the modified workpaper and at least one attribute of the second engagement management system, and
synchronize the work paper stored in the second engagement management system with the indicator stored in the first engagement management system.

29. The system of claim 11 wherein the audit code set is further configured to:

identify at least one audit area associated with a set of financial statement information;

automatically select and deselect audit plans for use in the audit based on the at least one attribute of the set of financial statement information; and modify at least one of the audit plans based on the at least one attribute of the set of financial statement information.

30. The system of claim 29 wherein the set of financial statement information and the at least one attribute of the set of financial statement information are defined and identified using eXtensible Business Reporting Language (XBRL).

31. A non-transitory computer program for assessing risks associated with an audit and embodied in a computer-readable medium configured for execution on a computer having an associated memory, display, and input device, the computer program comprising:

a graphical user interface adapted to operate on the computer and adapted to present a plurality of inquiries to a user comprising a plurality of audit items and a set of risk levels associated with the plurality of audit items, the plurality of audit items comprising in part, a set of assertions associated with a set of assertion categories, the set of assertion categories comprising assertions pertaining to classes of transactions and events for the period under audit, assertions pertaining to account balances at the period end and assertions pertaining to presentation and disclosure, the set of risk levels being associated with a plurality of audit risks comprising inherent risk, control risk and assessed risk of material misstatement, the graphical user interface adapted to receive a set of responses from the input device;

a response code set adapted to be executed on the computer and adapted to process the set of responses, associate a selected risk level from the set of risk levels to a given response from the set of responses input; and an audit code set adapted to be executed by the computer and adapted to:

automatically generate at least one customizable audit plan and one or more alternative audit plans based at least in part on a processed set of responses, the audit plan comprising a plurality of audit procedures associated with an audit area;

present to the user, by the display, the at least one customizable audit plan and one or more alternative audit plans; and present one or more electronic documents associated the at least one customizable audit plan and one or more alternative audit plan, aid one or more electronic documents maintained on one or more external engagement management systems, a given electronic document comprising a smart document.

32. The non-transitory computer program of claim 31 wherein the audit code set is adapted to guide a user through the audit plan.

33. The non-transitory computer program of claim 31 wherein the audit code set is further adapted to generate a textual summary of each of the plurality of audit procedures.

34. The non-transitory computer program of claim 33 wherein the audit code set is further adapted to:

associate a hyperlink with each of the textual summaries; and provide at least one subtask associated with the audit procedure in response to selection of the hyperlink.

35. The non-transitory computer program of claim 31 wherein the audit code set is further adapted to associate a selectable status identifier with each of the plurality of audit procedures.

36. The non-transitory computer program of claim 35 wherein each of the selectable status identifiers is color-coded to provide a visual indicator of at least one audit procedure status from the plurality of audit procedures.

37. The non-transitory computer program of claim 35 wherein the selectable status identifier includes a label value selected from the group consisting of 'Start', 'In Progress', and 'Completed'.

38. The non-transitory computer program of claim 31 wherein the audit code set is further adapted to guide a user to a last completed audit procedure if no audit procedures included in the audit are currently in process.

39. The non-transitory computer program of claim 31 wherein the audit code set is further adapted to guide a user to a most recent in process audit procedure.

40. The non-transitory computer program of claim 31 wherein the audit code set is further adapted to associate at least one assertion to each of the plurality of audit procedures and filter the plurality of audit procedures by the at least one assertion, and the graphical user interface is adapted to present the filtered audit procedures in response to a request.

41. The non-transitory computer program of claim 40 wherein the graphical user interface presents risk values relating to the at least one assertion.

42. The non-transitory computer program of claim 41 wherein the audit code set is further configured to:

compute an operational statistic related to the audit plan based on an audit dashboard; and provide the computed operational statistic in response to a request.

43. The non-transitory computer program of claim 42 wherein the graphical user interface displays the operational statistic in a tabular row column format.

44. The non-transitory computer program of claim 42 the graphical user interface displays the operational statistic graphically.

45. The non-transitory computer program of claim 42 wherein the audit dashboard comprises at least one of a number of audit procedures started, in progress, and completed.

46. The non-transitory computer program of claim 31, wherein the work paper is provided in a read-only mode.

47. The non-transitory computer program of claim 31, wherein the audit code set is further adapted to:

generate a work paper relating to an audit area in a first engagement management system;

store the work paper in a second engagement management system and an identifier to the work paper in the first engagement management system in response to a first request;

retrieve the work paper from the second engagement management system using the identifier in response to a second request; and provide the retrieved work paper in the first engagement management system in response to the second request.

48. The non-transitory computer program of claim 47, wherein the audit code set is further configured to:

modify the work paper in the first engagement management system;

automatically store the modified work paper in a location associated with the second engagement management system based on attributes of the modified workpaper and at least one attribute of the second engagement management system; and synchronize the work paper stored in the second engagement management system with the indicator stored in the first engagement management system.

49. The non-transitory computer program of claim 31, wherein the audit code set is further configured to:

identify at least one audit area associated with a set of financial statement information;

automatically select and deselect audit plans for use in the audit based on at least one attribute of the set of financial statement information; and modify at least one of the audit plans based on the at least one attribute of the set of financial statement information.

50. The non-transitory computer program of claim 49, wherein the set of financial statement information and the at least one attribute of the set of financial statement information are defined and identified using eXtensible Business Reporting Language (XBRL).

\* \* \* \* \*